(12) United States Patent
Kardos et al.

(10) Patent No.: US 6,345,281 B1
(45) Date of Patent: Feb. 5, 2002

(54) RECOVERY METHOD AND SYSTEM FOR A RESOURCE MANAGEMENT SYSTEM

(75) Inventors: Christopher P. Kardos, Cedar Rapids; Bin Xiong, Iowa City; Russell A. Brandt, Center Point, all of IA (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/260,858

(22) Filed: Mar. 1, 1999

(51) Int. Cl.[7] .......................... G06F 12/00; G06F 17/30
(52) U.S. Cl. ........................ 707/201; 700/28; 700/100; 700/101; 700/107; 700/106; 705/7; 705/8; 705/9; 707/202; 707/203; 707/204
(58) Field of Search ........................... 700/28, 99, 100, 700/101, 102, 104, 106, 107; 705/7, 8, 9; 707/1, 2, 202, 37, 100, 102, 201, 203, 204

(56) References Cited

U.S. PATENT DOCUMENTS

| | | | |
|---|---|---|---|
| 4,530,067 A | 7/1985 | Dorr | 364/900 |
| 4,569,421 A | 2/1986 | Sandstedt | 186/39 |
| 4,797,818 A | 1/1989 | Cotter | 364/401 |
| 4,882,475 A | 11/1989 | Miller et al. | 235/383 |
| 4,971,406 A | 11/1990 | Hanson | 340/711 |
| 5,386,551 A | * 1/1995 | Chikira et al. | 714/96 |
| 5,444,444 A | 8/1995 | Ross | 340/994 |
| 5,533,107 A | 7/1996 | Irwin et al. | 379/201 |
| 5,648,770 A | 7/1997 | Ross | 340/994 |
| 5,655,008 A | 8/1997 | Fuch et al. | 379/91.01 |
| 5,675,724 A | * 10/1997 | Beal et al. | 714/4 |
| 5,963,911 A | * 10/1999 | Walker et al. | 705/7 |
| 5,991,739 A | * 11/1999 | Cupps et al. | 705/26 |
| 6,026,365 A | * 2/2000 | Hayashi | 705/9 |
| 6,195,590 B1 | * 2/2001 | Powell | 700/36 |
| 6,219,649 B1 | * 4/2001 | Jameson | 705/8 |

* cited by examiner

Primary Examiner—William Grant
Assistant Examiner—Ramesh Patel
(74) Attorney, Agent, or Firm—Baker Botts LLP

(57) ABSTRACT

A recovery method for a resource management system having a message handler for communicating orders from a plurality of disparate hosts to an order processing system for assignment to remote resources includes shutting down the order processing system and the message handler. A restored order processing system is generated by replacing a current version of the order processing system with a previously saved version. The restored order processing system is restarted, as is the message handler. Each order in the restored processing system is set to pending. Orders in the restored order processing system that were closed subsequent to a time of the previously saved version are identified and deleted from the restored order processing system. Orders in the message handler that were transmitted from the message handler to the order processing system subsequent to the time of the previously saved version are identified. The subsequently transmitted orders that remain open in the message handler are then identified and transmitted to the restored order processing system for assignment to the remote resources.

22 Claims, 15 Drawing Sheets

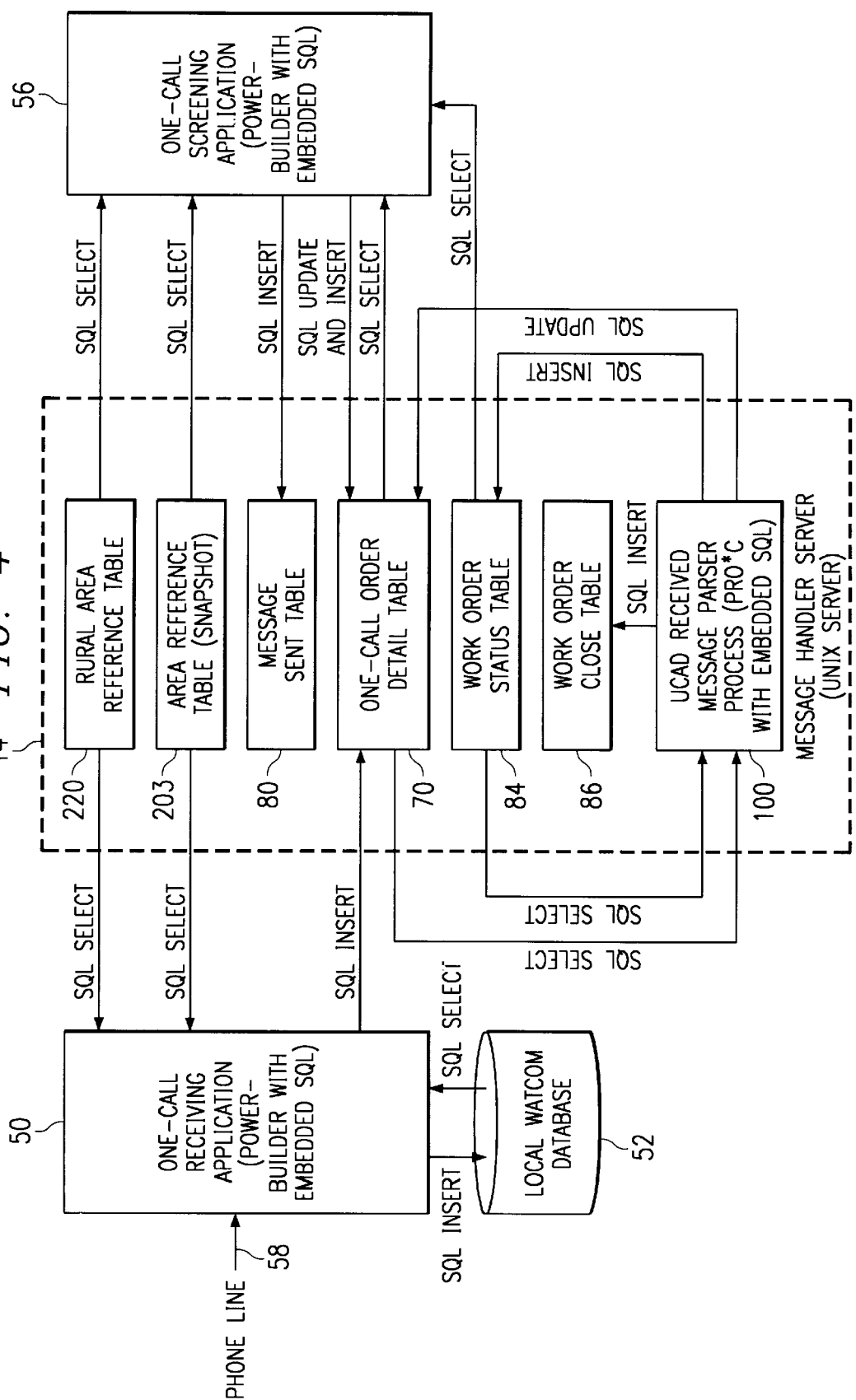

CAD Responses to Host Request

| Message Type | Purpose | MH Action |
|---|---|---|
| HNAK | Host request invalid | Update original host request message in message sent table to indicate error status. Send out alert message to alert printer. Update work order status table to ERR if applicable. |
| HACK | Host request ok | Fetch original transaction code from the message sent table using the message id, determine and take proper response action as indicated below, then delete the original request message from message sent table:<br>1. if original transaction is HOCx, HOUx, or HOR1, update work order status as PND in work order status table.<br>2. if original transaction is HOMx, leave work order status as it was before HOMx transaction.<br>3. if original transaction is HOX1, insert an order close message into work order close table and update work order status to CAN in work order status table.<br>4. if original transaction is HOD1, update work order status as DSP in work order status table.<br>5. for all other transactions, ignore the message. |

*FIG. 5A*

End-of-Day Notification from CAD Server

| Message Type | Purpose | MH Action |
|---|---|---|
| SED1 | End of the day processing | Update work order status table to the status indicated in the SED1 message. Additionally, for the first SED1 in a batch, record the date/time of the first SED1 in the batch and begin counting down the 2-minute timer. For subsequent SED1s in the same batch, reset the counter back to 2 minutes. When the 2-minute countdown reaches zero, insert a RED1 message into the message sent table. |

*FIG. 5B*

Ignored messages

| Message Type | Purpose | MH Action |
|---|---|---|
| All others | various notifications or host requests that business practice deems not necessary to process | Ignore |

*FIG. 5C*

Mobile Data Terminal related notifications from CAD Server

| Message Type | Purpose | MH Action |
|---|---|---|
| TOCx | Order Completion | If one-call order:<br>1. Update one-call order detail table with order completion data from the message.<br>2. Save the message in work order close table and mark its closed order indicator as 'Y'.<br>3. Update order status to 'CLS' in work order status table.<br>If ARJS or MOSO order:<br>1. Save the message in work order close table and mark its closed order indicator as 'N'.<br>2. Update order status to 'COM' in work order status table. |
| TER1 | Technician En-Route | Update work order status to ENR if appropriate. |
| TMA1 | Technician acknowledge of emergency order | Update work order status to EAT if appropriate. |
| TOS1 | Technician On-site | Update work order status to ONS if appropriate. |
| TOX1 | Technician suspend | Update work order status to INT if appropriate. |
| TSN1 | Technician sign-on | Record odometer reading or truck number if supplied, otherwise ignore. |

*FIG. 5C*

Orphan messages From CAD Server

| Message Type | Purpose | MH Action |
|---|---|---|
| ZOCx | Orphaned order completion | If order is already in its final status in work order status table, do nothing, otherwise process as if it were a normal TOCx order then generate an HOX1 (Host order cancel) message and insert it into message sent table. |
| ZER1 | Orphaned technician en-Route | Process as if it were a normal TER1 message. |
| ZOS1 | Orphaned technician on-site | Process as if it were a normal TOS1 message. |
| ZOX1 | Orphaned technician suspend | Process as if it were a normal TOX1 message. |

*FIG. 5E*

WinDisp related notifications from CAD Server

| Message Type | Purpose | MH Action |
|---|---|---|
| UBD1, UOA1, UOD1 | Order set back to dispatched, or reassigned, or dispatched | Update work order status to DSP if appropriate. |
| UEA1 | Manual acknowledge of emergency order | Update work order status to EAD if appropriate. |
| UOP1 | Order set back to Pending | Update work order status to PND if appropriate. |
| UOX1 | Dispatcher cancelled the order | If this is a one-call order:<br>1. Mark the order as 'voided by dispatcher' and set work flow indicator to 'V' in one-call order detail table.<br>2. Update work order status to UCN in work order status table.<br>3. Generate an OSS cancel message for one-call OSS watchdog to process, if necessary.<br>If this is an ARJS or MOSO order:<br>1. Create a order completion record in work order close table with the same order control number.<br>2. Update work order status to UCN in work order status table.<br>3. Generate an OSS cancel message for one-call OSS watchdog to process, if necessary. |
| UOC1, UOMx | Dispatcher created or modified an order. | Send alert to print out a warning at Dispatch Center. |

*FIG. 5D*

Message Handler generated message

| Message Type | Purpose | MH Action |
|---|---|---|
| RED1 | Kick off order redispatch process | Retrieve SED1 messages from the message received backup table. For each order that was set back to pending:<br>1. Query the work order status table to find the technician id that the order was last dispatched to.<br>2. Generate an HOD1 message and insert it into message sent table. |

*FIG. 5F*

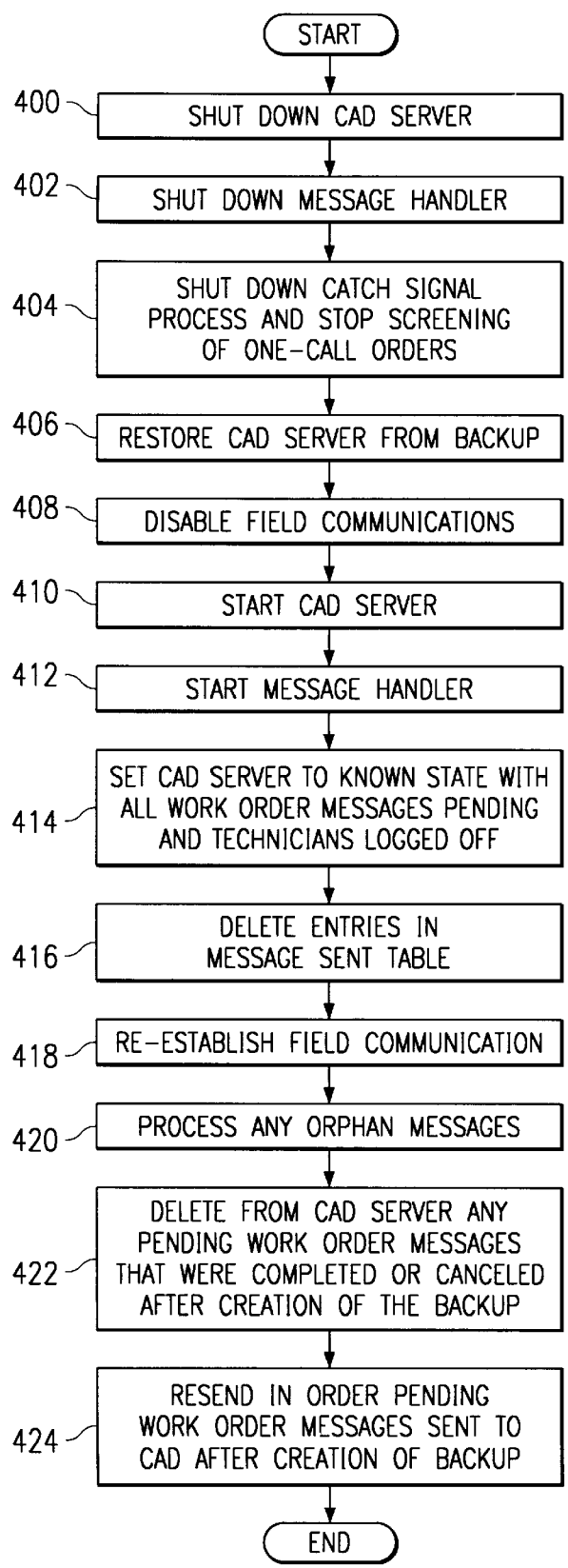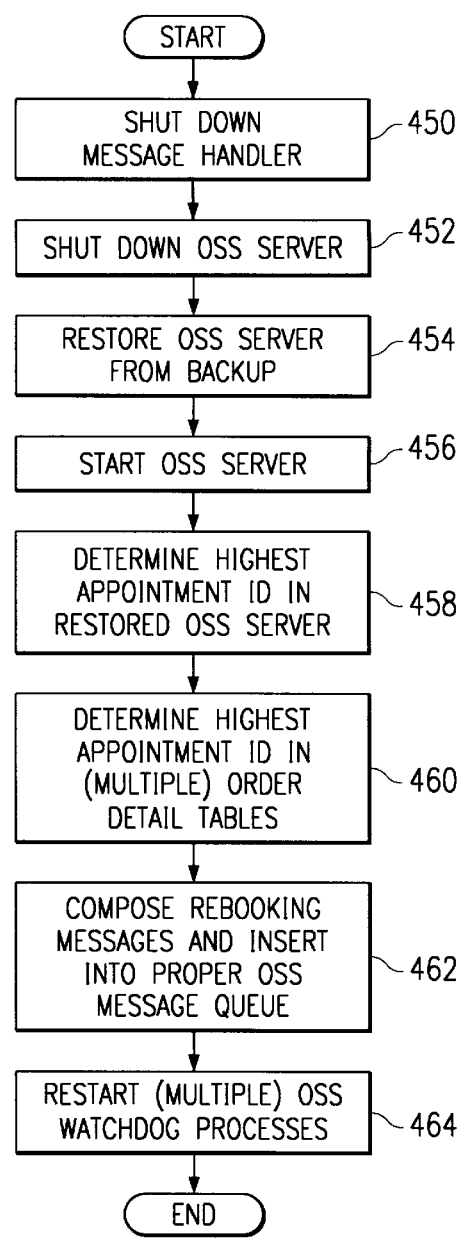

CAD Message Queue Table 32

```
transaction_id: VARCHAR2(04) NOT NULL
message_id: NUMBER(5) NOT NULL
```
```
message_created_date: DATE NOT NULL
message_data: VARCHAR2(2000) NOT NULL
```

OSS Message Queue Table 34

```
transaction_id: VARCHAR2(04) NOT NULL
message_id: NUMBER(5) NOT NULL
```
```
message_created_date: DATE NOT NULL
message_data: VARCHAR2(2000) NOT NULL
control_nbr: NUMBER(12) NOT NULL
error_msg: VARCHAR2(80) NULL
```

OSS Message Queue Backup 35

```
TRANSACTION_ID: VARCHAR2(04) NOT NULL
MESSAGE_ID: NUMBER(5) NOT NULL
MESSAGE_DATA: VARCHAR2(2000) NOT NULL
MESSAGE_CREATED_DATE: DATE NOT NULL
CONTROL_NBR: NUMBER(12) NOT NULL
ERROR_MSG: VARCHAR2(80) NULL
```

Area Reference Table 202

```
division_cd: NUMBER(2) NOT NULL
town_cd: NUMBER(2) NOT NULL
zip_cd: NUMBER(5) NOT NULL
```
```
area_cd: VARCHAR2(06) NULL
subarea_cd: VARCHAR2(06) NULL
town_name: VARCHAR2(24) NOT NULL
CAD_indc: CHAR(1) NOT NULL
DMS_indc: CHAR(1) NOT NULL
WMS_indc: CHAR(1) NOT NULL
FK_managers_printer_id: VARCHAR2(4) NULL
WMS_Crew_HQ_cd: VARCHAR2(6) NULL
WMS_Oper_ID: VARCHAR2(10) NULL
WMS_district_cd: VARCHAR2(4) NULL
Last_Updated_by_ID: VARCHAR2(8) NOT NULL
Last_Updated_Date: DATE NOT NULL
```

Work Order Detail Table 36

```
control_nbr: NUMBER(12) NOT NULL
```
```
appointment_id: VARCHAR2(09) NULL
appointment_start_time: DATE NULL
appointment_end_time: DATE NULL
appointment_max_date: DATE NULL
area_cd: VARCHAR2(06) NOT NULL
subarea_cd: VARCHAR2(06) NOT NULL
job_cd: VARCHAR2(09) NOT NULL
zip_cd: VARCHAR2(05) NOT NULL
related_hidden_control_nbr: NUMBER(12) NOT NULL
district_cd: CHAR(01) NOT NULL
emergency_indc: CHAR(01) NOT NULL
customer_account_nbr: VARCHAR2(13) NOT NULL
transformer_section_nbr: VARCHAR2(07) NOT NULL
order_entered_date: DATE NOT NULL
voided_by_user_id: VARCHAR2(06) NULL
commitment_cd: CHAR(1) NOT NULL
street_nbr: VARCHAR2(6) NULL
street_suffix_nbr: CHAR(1) NULL
prefix_directional_cd: VARCHAR2(2) NULL
street_name: VARCHAR2(30) NULL
street_type_cd: VARCHAR2(4) NULL
suffix_directional_cd: VARCHAR2(2) NULL
town_name: VARCHAR2(24) NULL
state_cd: CHAR(2) NULL
service_location_desc: VARCHAR2(10) NULL
```

Host Error Table 46

```
error_date: DATE NOT NULL
transaction_id: VARCHAR2(04) NULL
message_id: NUMBER(5) NULL
oracle_error_nbr: NUMBER NULL
oracle_error_message_data: VARCHAR2(255) NULL
module_name: VARCHAR2(30) NULL
appl_error_nbr: NUMBER NULL
appl_error_message_data: VARCHAR2(255) NULL
```

One Call Order Detail Table (70)

| control_nbr: NUMBER(12) NOT NULL |
|---|
| request_nbr: VARCHAR2(11) NOT NULL
sequence_nbr: NUMBER(4) NULL
utility_type_cd: CHAR(01) NOT NULL
ticket_type_desc: VARCHAR2(25) NULL
sent_date: DATE NOT NULL
request_date: DATE NOT NULL
town_name: VARCHAR2(24) NULL
county_name: VARCHAR2(24) NULL
section_quarter_cd: VARCHAR2(03) NULL
township_cd: VARCHAR2(06) NULL
street_name: VARCHAR2(50) NULL
street_type_cd: VARCHAR2(04) NULL
additional_info_comm: VARCHAR2(255) NULL
cross_street1_comm: VARCHAR2(255) NULL
cross_street2_comm: VARCHAR2(255) NULL
type_of_work_desc: VARCHAR2(50) NULL
additional_work_info_comm: VARCHAR2(255) NULL
dig_date: DATE NULL
joint_meet_date: DATE NULL
caller_name: VARCHAR2(20) NULL
caller_title_name: VARCHAR2(20) NULL
caller_phone_comm: VARCHAR2(50) NULL
callback_comm: VARCHAR2(11) NULL
contractor_name: VARCHAR2(40) NULL
contractor_addr: VARCHAR2(50) NULL
contractor_city_name: VARCHAR2(18) NULL
contractor_state_cd: VARCHAR2(02) NULL
contractor_zip_cd: VARCHAR2(10) NULL
area_cd: VARCHAR2(06) NULL
subarea_cd: VARCHAR2(06) NULL
priority_cd: NUMBER(2) NULL
business_unit_cd: VARCHAR2(06) NULL
job_cd: VARCHAR2(09) NULL
work_flow_indc: CHAR(01) NOT NULL
appointment_start_time: DATE NULL
appointment_end_time: DATE NULL
appointment_max_date: DATE NULL
received_date: DATE NOT NULL
order_printed_indc: CHAR(1) NOT NULL
processed_by_user_id: VARCHAR2(06) NULL
transmit_cd: CHAR(01) NULL
work_started_date: DATE NULL
work_completed_date: DATE NULL
electric_status_cd: CHAR(01) NULL
gas_status_cd: CHAR(01) NULL
steam_status_cd: CHAR(01) NULL
gas_mark_cd: CHAR(01) NULL
electric_mark_cd: CHAR(01) NULL
steam_mark_cd: CHAR(01) NULL
completed_comm: VARCHAR2(160) NULL
fk_parent_control_nbr: NUMBER(12) NULL (FK)
appointment_id: NUMBER(9) NULL |

One Call Message Queue (54)

| transaction_id: VARCHAR2(04) NOT NULL
message_id: NUMBER(5) NOT NULL |
|---|
| message_created_date: DATE NOT NULL
message_data: VARCHAR2(2000) NOT NULL
control_nbr: NUMBER(12) NOT NULL
error_msg: VARCHAR2(80) NULL |

One Call OSS Message Queue Backup (55)

| TRANSACTION_ID: VARCHAR2(4) NOT NULL
MESSAGE_ID: NUMBER(5) NOT NULL
MESSAGE_DATA: VARCHAR2(2000) NOT NULL
MESSAGE_CREATED_DATE: DATE NOT NULL
CONTROL_NBR: NUMBER(12) NOT NULL
ERROR_MSG: VARCHAR2(80) NULL |
|---|

Rural Area Reference Table (220)

| County_Name: VARCHAR2(24) NOT NULL
Township_Name: VARCHAR2(24) NOT NULL
Section_Quarter_Cd: VARCHAR2(3) NOT NULL |
|---|
| area_cd: VARCHAR2(6) NOT NULL
subarea_cd: VARCHAR2(6) NOT NULL
Last_Updated_by_ID: VARCHAR2(8) NOT NULL
Last_Updated_Date: DATE NOT NULL |

Area Reference Table Snapshot (203)

| division_cd: NUMBER(2) NOT NULL
town_cd: NUMBER(2) NOT NULL
zip_cd: NUMBER(5) NOT NULL |
|---|
| area_cd: VARCHAR2(06) NULL
subarea_cd: VARCHAR2(06) NULL
town_name: VARCHAR2(24) NOT NULL
CAD_indc: CHAR(1) NOT NULL
DMS_indc: CHAR(1) NOT NULL
WMS_indc: CHAR(1) NOT NULL
FK_managers_printer_id: VARCHAR2(4) NULL
WMS_Crew_HQ_cd: VARCHAR2(6) NULL
WMS_Oper_ID: VARCHAR2(10) NULL
WMS_district_cd: VARCHAR2(4) NULL
Last_Updated_by_ID: VARCHAR2(8) NOT NULL
Last_Updated_Date: DATE NOT NULL |

RECOVERY METHOD AND SYSTEM FOR A RESOURCE MANAGEMENT SYSTEM

RELATED APPLICATIONS

This application is related to copending U.S. patent application Ser. No. 09/260,859, entitled "INTEGRATED RESOURCE MANAGEMENT SYSTEM AND METHOD" filed Mar. 1, 1999.

TECHNICAL FIELD OF THE INVENTION

This invention relates generally to the field of resource management systems, and more particularly to a recovery method and system for a resource management system.

BACKGROUND OF THE INVENTION

Modern businesses often employ computer systems to manage resources more efficiently. Such resource management systems allow utilities and other service providers to automatically schedule work, dispatch needed personnel to perform the work, and monitor the status of the work. This allows a utility to respond quickly to customer needs and meet customer expectations.

One type of resource management system is MDSI's Advantex server application that provides a mobile workforce management system. Using this system, a utility, for example, can dispatch and schedule work orders such as meter and service orders. Because work orders are automatically dispatched, more accurate information is available on workloads. This enables efficient scheduling of resources. In addition, paperwork is minimized and work status information is available in a much more timely manner.

A problem with known resource management systems is that they are unable to fully associate some information received from a mobile or remote workforce with corresponding work orders. Such orphan information is often discarded and thus not available to the system. In addition, information may be lost or discarded during recovery processing.

SUMMARY OF THE INVENTION

The present invention provides a recovery method and system for a resource management system that substantially eliminate or reduce the disadvantages and problems associated with previous systems and methods.

In accordance with one aspect of the present invention, a recovery method for a resource management system having a message handler for communicating orders from a plurality of disparate hosts to an order processing system for assignment to remote resources includes shutting down the order processing system and the message handler. A restored order processing system is generated by replacing a current version of the order processing system with a previously saved version. The restored order processing system is restarted, as is the message handler. Each order in the restored processing system is set to pending. Orders in the restored order processing system that were closed subsequent to a time of the previously saved version are identified and deleted from the restored order processing system. Orders in the message handler that were transmitted from the message handler to the order processing system subsequent to the time of the previously saved version are identified. The subsequently transmitted orders that remain open in the message handler are then identified and transmitted to the restored order processing system for assignment to the remote resources.

In accordance with another aspect of the present invention, a recovery method for a resource management system having a message handler for communicating scheduling messages from a plurality of disparate hosts to an order processing system for assignment includes shutting down the order scheduling system and the message handler. A restored order scheduling system is generated by replacing a current version of the order scheduling system with a previously saved version. The restored order scheduling system and message handler are then restarted. Scheduling assignments in the message handler that were generated by the order scheduling system subsequent to a time of the previously saved version are identified. The subsequently generated scheduling assignments that remain open in the message handler are then identified and transmitted to the restored order scheduling system for rescheduling.

In accordance with still another aspect of the present invention, a method for processing orphan information in a system having a message handler communicating orders from a plurality of disparate hosts to an order processing system for assignment to remote resources includes receiving at the order processing system and from the remote resources, a response to an assignment. The order processing system determines whether the response is properly associated with an order. If the response is properly associated with an order in the order processing system, a normal transaction ID of the order is included with the response. If the response is not properly associated with an order in the order processing system, a predefined orphan ID is included with the response. The response is transmitted to the message handler. At the message handler, the response is associated with a corresponding order previously sent to the order processing system. In response to at least the orphan ID, a message operable to delete the corresponding order from the order processing system is generated. The message is then transmitted to the order processing system.

Technical advantages of the present invention include providing improved recovery processing for computer-aided dispatch, order scheduling, and other suitable workforce or resource systems. In particular, the computer-aided dispatch, order scheduling, or other suitable system is restored from a previously saved version and updated to a current state by determining work order, scheduling, or other messages that need to be retransmitted, retransmitting such work orders and messages in their original sequence, and performing additional automated processing to ensure consistency of the information in the host and resource management systems. In this way, the failed system is restored, updated, and synchronized with the message handler and remaining elements in the resource management system.

Another technical advantage of the present invention includes providing a method and system for processing orphan responses received from a computer-aided dispatch or other suitable workforce or resource system. In the case of MDSI's Advantex computer-aided dispatching system, messages received from Mobile Data Terminals in the field are susceptible to being "orphaned" under certain circumstances, resulting in an inability to pass the messages to the message handler in the normal fashion. Normally, these messages, which contain critical business information relative to the status and closing of host system work orders, would be discarded by the CAD system, resulting in lost business information and orders being stranded within the CAD system in an incomplete state. In this particular embodiment of the invention, the messages that would otherwise be lost are transmitted to the message handler which uses a host control number embedded in the message to link the orphan message with its associated host order. The message handler further contains all the code necessary to post the status and closing information as if the messages had not been "orphaned" and to resynchronize the integrated system by issuing commands to the CAD system to cancel the (already completed) stranded orders. This assures that the dispatchers will not redispatch the orders to be worked again in the field.

Other technical advantages of the present invention will be readily apparent to those skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 4 is an architecture/flow diagram illustrating an integration of a particular One Call (digger's hotline) system with the CAD message handler in one embodiment of the invention;

FIGS. 5A–G are tables that describe the CAD message handler's response to the various messages it receives from the CAD server in one embodiment of the invention;

FIG. 9 is a flow diagram illustrating recovery processing for the computer-aided dispatch (CAD) system of FIG. 1 in one embodiment of the invention;

FIG. 10 is a flow diagram illustrating recovery processing for the order scheduling system (OSS) of FIG. 1 in one embodiment of the invention; and FIGS. 11A–C are data models which provide additional details concerning the structure and content of the key tables used by the host systems and the CAD and OSS message handlers in one embodiment of the invention.

DETAILED DESCRIPTION OF THE INVENTION

The preferred embodiments of the present invention and its advantages are best understood by referring now in more detail to FIGS. 1–11 of the drawings, in which like numerals refer to like parts throughout the several views. FIGS. 1–11 illustrate a method and system for communicating between a plurality of disparate hosts and an order processing system.

As described in more detail below, orders are generated at each of the disparate hosts. The orders are transmitted from each of the hosts to a shared message handler using relational database statements. Relational database statements are SQL or equivalent commands such as insert, delete, update, and stored procedure calls. At the shared message handler, the orders are stored in a relational database table structure using relational database statements. The orders are transmitted from the relational database structure of the shared message handler to the order processing system. Responses to the orders are received at the shared message handler from the order processing system. Each of the responses is associated with a corresponding order. The status of the corresponding orders are updated based on the responses and provided to each of the hosts. In this way, each of the hosts are able to communicate orders to and share a mobile workforce system or other remote or distributed resources.

In addition, in accordance with another aspect of the present invention, a recovery method and system are provided for the resource management system. As described in more detail below, a computer-aided dispatch, order scheduling or other suitable order processing system is restored from a previously saved version and updated to a current state by determining work order, scheduling, or other orders that need to be retransmitted and then retransmitting such orders and messages in their original order. In this way, the failed system is restored, updated, and synchronized with a shared message handler and remaining elements in the system. During recovery processing and normal operation of the system, the present invention further provides a method and system for processing orphan responses received from the order processing system. This assures that orders will not be redispatched and again worked in the field.

Figure 1A:
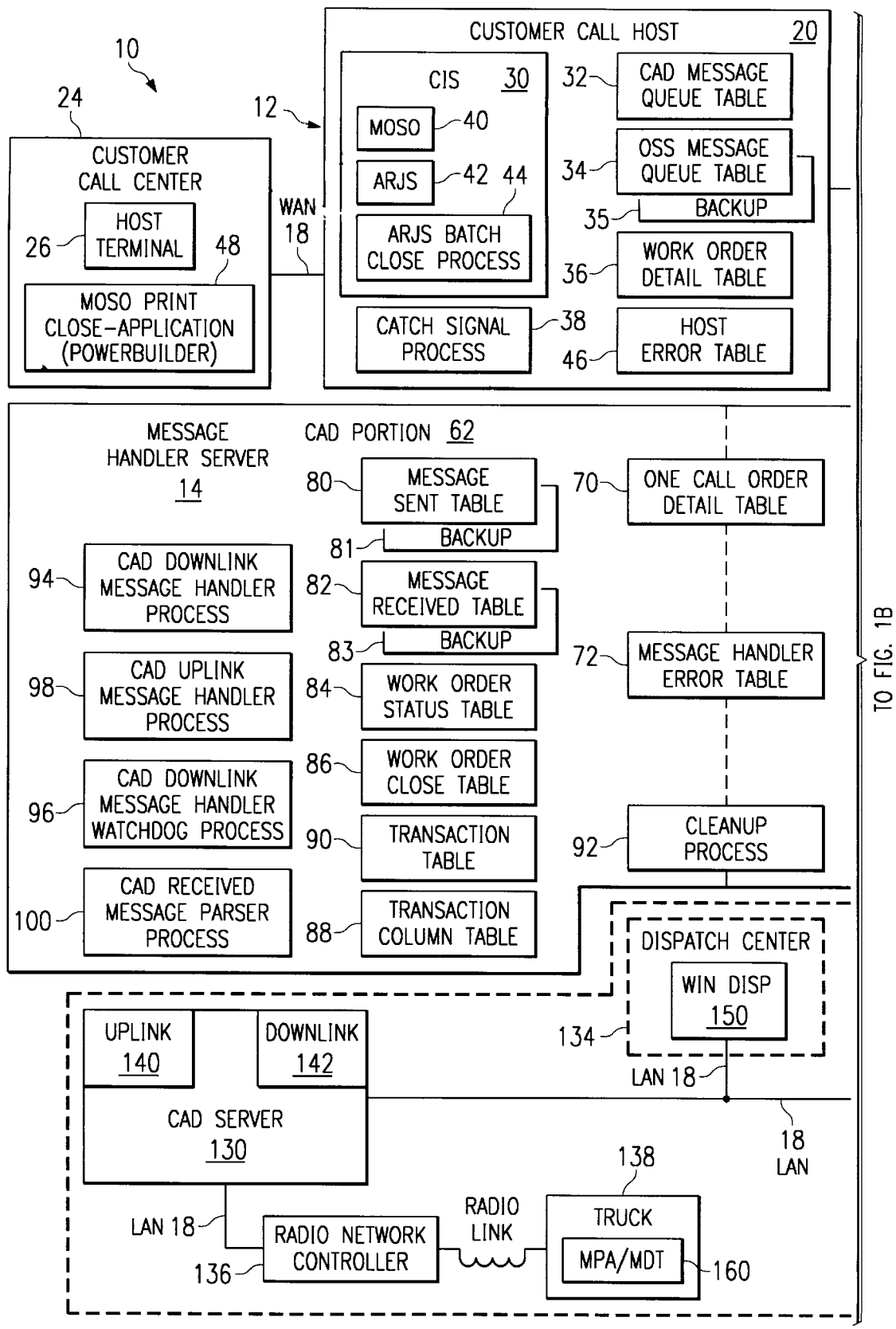
FIGS. 1A–B are block diagrams illustrating an integrated resource management system in accordance with one embodiment of the present invention.
Figure 1B:
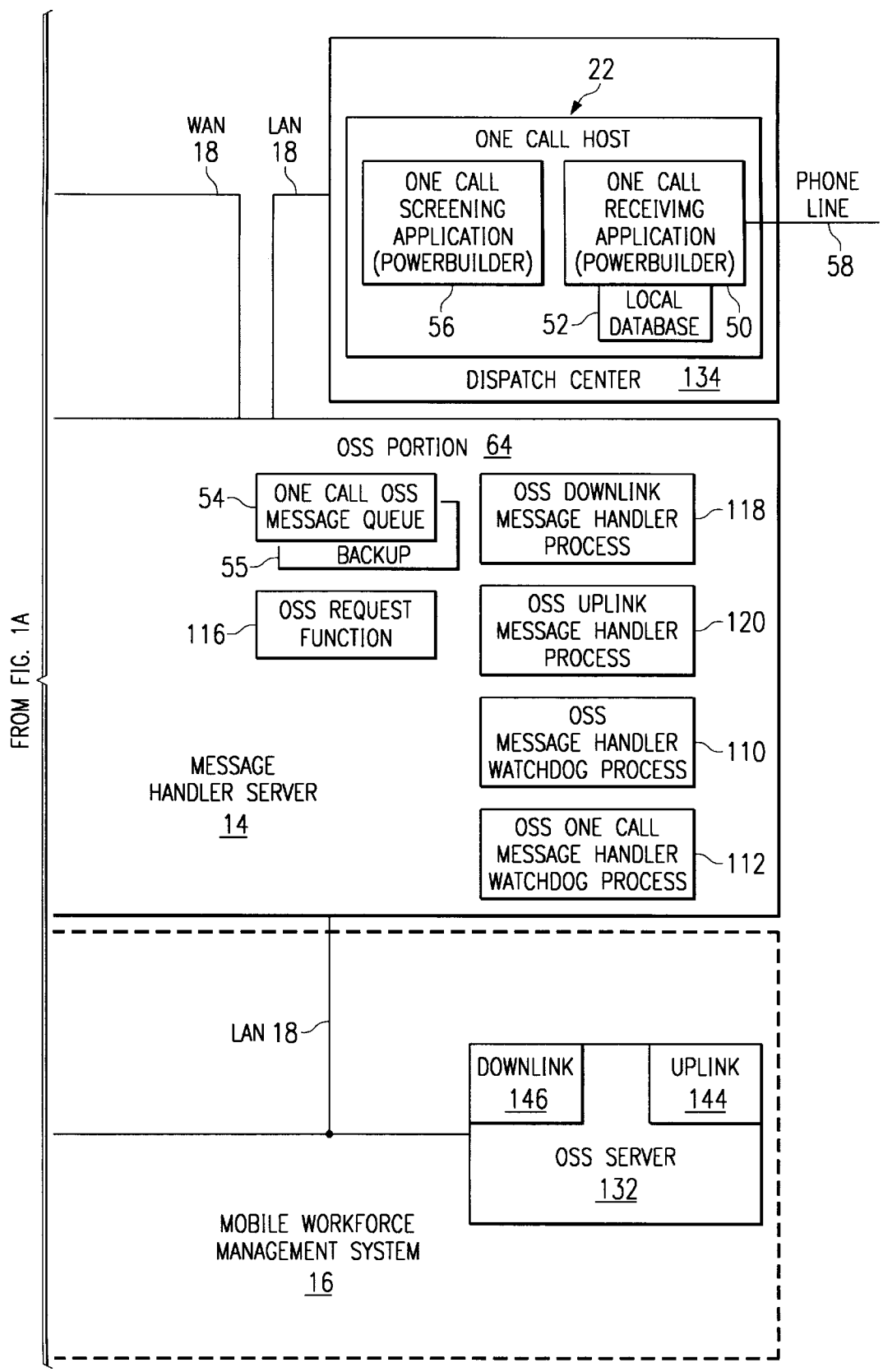

FIGS. 1A–B are block diagrams illustrating an integrated resource management system 10 in accordance with one embodiment of the present invention. In this embodiment, the integrated resource management system 10 is used by an electrical utility to log, schedule, dispatch, and monitor consumer initiated and one call (digger's hotline—locating and marking underground facilities) work orders. The integrated resource management system 10 may be further used by an electrical utility for planned maintenance, door posting, and other suitable work and by other types of businesses to manage a mobile or distributed workforce or otherwise communicate between a plurality of disparate hosts and an order processing system.

Referring to FIGS. 1A–B, the integrated resource management system 10 includes a plurality of hosts 12, a message handler server 14, and a mobile workforce management system 16 interconnected by a network system 18. The network system 18 may be one or more local area networks (LAN), wide area networks (WAN), a combination of local and wide area networks, or other suitable network or networks utilizing Transmission Control Protocol/Internet Protocol (TCP/IP). In addition, suitable elements of the integrated resource management system 10 may operate on shared hardware platforms and therefore directly communicate without need of the network 18.

In the integrated resource management system 10, the hosts 12 receive and/or generate work requests and scheduling requests that are transmitted in the form of messages to the message handler server 14 for retransmission to the mobile workforce management system 16. The mobile workforce management system 16 schedules, dispatches, and monitors the status of work for the utility. The message handler server 14 allows the plurality of hosts 12 to each communicate with the mobile workforce management system 16 and thus forms an integrated system. As used herein, each means each of at least a subset of the identified items.

As described in more detail below, the hosts 12, message handler server 14, and mobile workforce management system 16 include computer software and data. The computer software and data are generally identified by modules, database tables, files, and the like that are stored and/or loaded into memory for processing. The exemplary embodiment of the invention uses Oracle relational database systems installed on multiple network connected mainframe and UNIX servers. The multiple Oracle instances rely on Oracle SQL*Net and Oracle distributed database functionality to communicate seamlessly in the exemplary network environment. It will be understood that other relational database products can be substituted for Oracle and that the computer software and data may be otherwise combined and/or divided for processing without departing from the scope of the present invention. Accordingly, the labels of the modules and database tables are for illustrative purposes and may be suitably varied. The computer software and tables may, when needed, be loaded into memory from disk storage (not shown). Disk storage may include a variety of types of storage media such as, for example, floppy disk drives, hard disk drives, CD-ROM drives, or magnetic tape drives. System memory may include one or more memory devices such as RAM, ROM, disk storage, and the like.

In one embodiment of the invention, the hosts 12 include a customer call host 20 and a one call host 22. Generally described, the customer call host 20 generates work order and scheduling messages initiated by customers. Customer requests for services are received at a call center 24 by call center agents and entered via terminals 26 into the customer call host 20. The one call host 22 receives work requests for locating and marking underground facilities from a third-party digger's hotline provider via a modem and phone line. In addition to an application for receiving the orders, the one call host 22 includes a second application which allows dispatch personnel to pre-screen the orders prior to dispatching them to be worked by field personnel.

In this embodiment of the invention, the integration of the customer call host 20 and the one call host 22 represent two variations of the integration method. The first method, which is illustrated by the exemplary customer call host 20 integration, includes a robust method of queuing messages to permit the host system to remain operable in the case of network 18 and other remote system failures. This first method can be used with any other host system, but is especially recommended for host systems that have a requirement to remain operable in the event of network 18 failures or failures of the remote components of the integrated resource management system 10.

The second method, which is illustrated by the exemplary one call host 22 integration, provides a reduced functionality for queuing certain messages, but is less complex and easier to implement. This second method is sufficient for host systems which are not required to remain operable in the event of network 18 failures or failures of the remote components of the integrated resource management system 10. In the exemplary one call host 22 integration, the one call screening application 152 utilizes the Oracle instance on the message handler server 14 for it's primary data store and the application is incapable of operating in the event of network 18 failure or any failure on the message handler server 14 that renders the Oracle instance on that server inoperable. Thus, there is no need to provide fully robust queuing of work order and scheduling messages destined for the mobile workforce management system 16.

Customer Call Host

The customer call host 20 includes a customer information system (CIS) 30, a computer-aided dispatch (CAD) message queue 32, an order scheduling system (OSS) message queue 34, an order scheduling system (OSS) message queue backup 35, a work order detail table 36, a catch signal process 38, and a host error table 46. In this particular embodiment, the CIS 30 consists of two CICS/VSAM legacy systems, an Action Request Job Slip (ARJS) system 42 and a Meter Order/Service Order (MOSO) system 40, plus an ARJS batch closing process 44, all of which exist on a mainframe computer running IBM's MVS operating system and Oracle database management system. The CAD message queue 32, OSS message queue 34, OSS message queue backup 35, work order detail table 36, and host error table 46 are Oracle tables and the catch signal process 38 is an Oracle PL/SQL stored procedure embedded within a COBOL II program. In this embodiment, the CIS 30 uses standard query language (SQL) statements embedded in CICS/COBOL II to communicate with Oracle tables and stored procedures.

For the exemplary utility embodiment, the CIS 30 includes a Meter Order/Service Order (MOSO) subsystem 40 for work orders related to activities such as installing and reading meters and an Action Report Job Slip (ARJS) subsystem 42 for fixing problems such as downed power lines, leaking natural gas, and the like. Requests for services received at the call center 24 are entered into the appropriate MOSO or ARJS subsystem 40 or 42. Details of work order messages needed by the computer-aided dispatching portion of the mobile workforce management system 16 are inserted from the MOSO 40 and ARJS 42 subsystems into the CAD message queue 32 for communication via the message handler server 14 to a computer-aided dispatch (CAD) server 130 of the mobile workforce management system 16. Once messages are inserted into the CAD message queue 32, the catch signal process 38 is alerted to retrieve the message and insert it into the message sent table 80 of the message handler server 14. This operation, which involves two separate Oracle instances, one on the customer call host 20 and the other on the message handler server 14, is accomplished using Oracle distributed database technology. Once a message is successfully inserted into the message sent table 80, the catch signal process 38 deletes the work order message from the CAD message queue 32.

Details of scheduling messages needed by the order scheduling portion of the mobile workforce management system 16 are transmitted to the order scheduling system server 132 either by an interactive method which involves calling an Oracle stored procedure known as the OSS request function 116, or by a non-interactive method which involves inserting the message into the OSS message queue 34 for deferred processing by the OSS message handler watchdog process 110. Both of these methods also make use of Oracle distributed database technology.

More specifically, if customer call center 24 personnel wish to request a list of available appointments from the OSS server 132 or to immediately confirm that a particular appointment request is accepted by the OSS server 132, then interaction with the OSS server 132 is accomplished in an interactive mode by having the ARJS 42 and MOSO 40 systems on the CIS host 30 directly call an Oracle stored procedure identified as the OSS request function 116. For customer requests that can be worked over a span of dates in the future (as opposed to an appointment on a fixed day), it is necessary only to inform the OSS server 132 of the work request and it is not necessary to wait for a reply or confirmation. In this case, the interaction with the OSS server 132 is accomplished in a non-interactive fashion by inserting the request message into the OSS message queue 34 where it will be retrieved and processed by the OSS message handler watchdog process 110. Nominally, this retrieval and processing will occur within a few seconds after insertion of the message into the OSS message queue 34; however, in cases of network 18 or other unspecified failures, retrieval and processing could be delayed for an indeterminate period of time. Once a schedule message is processed successfully by the OSS message handler watchdog 110, the message is deleted from the OSS message queue 34.

The OSS request function 116 can be called directly from multiple hosts 12 and from the various processes that exist on the message handler server 14 and it is utilized by the OSS message handler watchdog process 110. Thus, the OSS request function 116 serves as an integrating mechanism for all OSS interactions.

As indicated, the CAD and OSS message queues 32 and 34 accept messages generated by the CIS 30 for transmission to the message handler server 14. In particular, the CAD message queue 32 stores work order messages while the OSS message queue 34 stores scheduling messages. Provision of the CAD and OSS message queues 32 and 34 ensures that messages entered during a network 18 or other system failure are not lost, but remain in the message queues 32 and 34 until the network 18 failure or other failure is rectified. For work request messages, once the network 18 or other failure is rectified, the stored messages are inserted into the message sent table 80 on the message server 14 by the catch signal process 38. The catch signal process 38 may operate periodically, such as once every minute, to transmit all messages stored in the CAD message queue 32, or may be launched in response to a message being inserted into the CAD message queue 32 or other suitable event. When the network 18 or the message handler server 14 is down, the catch signal process 38 will continue to attempt to send the work order messages in the CAD message queue 32 until the network 18 failure or other failure is rectified and the transmission is successful.

The CAD message queue 32 may be omitted if the customer call host 20 is not remote from the message handler server 14. In this case, the messages may be directly inserted into the message sent table 80 within the message handler server 14.

As noted, once work orders and scheduling messages have been successfully transmitted to the message handler server 14, the messages may be deleted from the message queues 32 and 34 on the customer call host 20. The OSS message queue 34, however, includes an OSS message queue backup 35 that retains an archive of all scheduling messages. The OSS message queue backup 35 is used for troubleshooting and other suitable purposes. It is also desirable to maintain an archive of work request messages for troubleshooting and other suitable purposes; however, it is not necessary for the CIS host 20 to maintain such an archive because work order messages are archived in the message sent backup table 81 on the message handler server 14.

Integration of the host systems 12 with the mobile workforce management system 16 requires that the host systems 12 maintain a record of certain information pertaining to the work orders (e.g., start and end dates for the appointments, appointment ID's, CAD areas, etc.). Some of these attributes were newly introduced with the introduction of the mobile workforce management system 16, and thus are not stored in the native data files of the various host applications. In the exemplary case of the legacy ARJS 42 and MOSO 40 systems, details of the work order and scheduling requests that are either not stored in the data structures native to those applications or are not conveniently available because of technical considerations are inserted into the work order detail table 36, where they remain available to these applications in the event of a need to delete, reschedule, or modify the work orders.

In the exemplary embodiment, the CIS 30 also includes an ARJS batch close process 44 for closing orders. The ARJS batch close process 44 accesses the work order detail table 36 and a work order close table 86 on the message handler server 14 to determine orders that have been either worked and closed or voided by the mobile workforce management system 16 and then closes or voids those orders in the ARJS 42 system. The ARJS close procedure 44 may be a batch process run daily during off hours. In this embodiment, the CIS 30 is updated once daily to reflect closed work orders.

In the exemplary embodiment, the utility has determined that closing of MOSO 40 work orders cannot be automated because the complexity of business process logic requires human intervention in the process. Accordingly, the exemplary embodiment includes a MOSO print close application 48 in the customer call center 24 which is operable to retrieve MOSO closing data from the work order detail table 36 and work order close table 86 and print the data for later entry by properly trained customer call center 24 staff. The MOSO print close application 48 is a PowerBuilder application, running on a networked Windows 95 PC and utilizing embedded SQL and Oracle SQL*Net to access the identified Oracle tables.

One Call Host

The one call host 22 includes a one call receiving application 50, a local database 52, and a one call screening application 56. Generally described, the one call host 22 receives and processes a specific type of message electronically. For example, the one call host 22 may be a digger's hotline operated by a third party provider. In this and other embodiments, the one call host 22 may operate on a personal computer connected to an incoming phone line 58 by a modem or other suitable platform. In this particular embodiment, the one call receiving application 50 is a PowerBuilder application, running on a networked Windows 95 PC and utilizing embedded SQL and Oracle SQL*Net to access various Oracle tables on the message handler server 14. The local database may be a relational database product such as Watcom.

The one call receiving application 50 receives information electronically from the phone line 58, automatically processes the information in accordance with information stored in its local database 52, and stores the one call request in the same local database 52. As used herein, an event is automatic in that the event is predefined and carried out by the computer process. The event may be immediate or in response to a user action or other suitable event. The automatic processing performed by the one call receiving application 50 includes assignment of the work to CAD areas based on geographic considerations and calculation of default start and end dates for the work based upon the specific type of one call order received. By utilizing a local database in the manner described, the one call receiving application itself can remain functional to receive one call requests even in the event of network 18 or other remote system failures.

Upon receipt of one call orders, the one call receiving application 50 attempts to upload the one call order information to the one call order detail table 70 on the message handler server 14. In the event the one call receiving application 50 is unable to perform this upload owing to a network 18 failure or other failure which renders the one call order detail table 70 inaccessible, the one call receiving application 50 will periodically, at a configurable time interval, reattempt the transmission. Once the one call order information is successfully uploaded to the one call order detail table 70, the one call receiving application 50 marks the corresponding information in its local database 52 as successfully sent in order to prevent additional attempts at uploading the same information.

In the exemplary embodiment of the invention, the one call screening application 56 is operable to allow the one call orders to be reviewed by a knowledgeable user before being transmitted to the message handler server 14. This allows for manual clearing of selected one call order without dispatching field personnel to perform the actual locate on a consumer's premise. For one call orders that do need to be dispatched for execution by field personnel, the one call screening application provides the functionality for verifying, and overriding if necessary, the scheduled work dates, CAD area assignments, and other information that was automatically assigned by the one call receiving application 50.

The one call screening application 56 is also a PowerBuilder application, running on a networked Windows 95 PC and utilizing embedded SQL and Oracle SQL*Net to access various Oracle tables on the message handler server 14. In the exemplary utility embodiment, the one call receiving application 50 and the one call screening application 56 reside on PC's located at the dispatch center 134 and are utilized by the dispatching personnel stationed at the dispatch center 134.

As stated, the message handler server 14 includes a one call order detail table 70. The one call order detail table 70 stores information necessary to track one call messages in the integrated resource management system 10. In this respect, the one call order detail table 70 is similar to the work order detail table 36 used for the customer call host 20 integration; however, in the case of the one call host 22 integration, the one call order detail table 70 also serves as the primary repository for storing the fundamental information concerning each one call order received and uploaded by the one call receiving application 50. The information initially inserted into the one call order detail table 70 by the one call receiving application 50 is updated at various points in time by the one call screening application 56, the CAD received message parser process 100, and the OSS one call message handler watchdog process 110. This information is used to determine the status of one call messages and to support the processing of one call order modification, rescheduling and cancellation requests. The information in the one call order detail table 70 is also available to other programs in the integrated resource management system 10.

In the exemplary embodiment, dispatcher's utilizing the one call screening application 56 may choose either to clear or void an order without sending it to the mobile workforce management system 16 or to send it to the mobile workforce management system 16 to be worked by field personnel. In the latter case, the dispatcher's select a "send to CAD" option within the one call screening application 56. This results in the one call screening application 56 automatically generating the appropriate work order messages and scheduling messages for the mobile workforce management system 16. For reasons described previously, the work order messages destined for the CAD server 130 are inserted directly into the message sent table 80 on the message handler server 14, without any special provisions for queuing. The scheduling messages destined for the OSS server 132 are inserted into the one call OSS message queue table 54 on the message handler server 14. Interactive mode communications with the OSS server 132, as described above for the case of the exemplary customer call host 20 integration, are not required for the one call host 22 integration and thus are not provided for in this particular embodiment of the invention. This is because there is no opportunity for utility personnel to interact with the consumer to establish an acceptable appointment date for the one call work.

In this embodiment of the invention, the one call OSS message queue 54 serves an identical function to the OSS message queue 34 on the customer call host 20. Although it would be possible for the one call screening application to utilize the OSS message queue 34 on the customer call host 20, the one call OSS message queue 54 is provided locally on the message handler server 14 to ensure that network 18 problems or other problems with the customer call host 20 will not interfere with operation of one call order processing. As is done in the case of the OSS message queue 34, an archive copy of one call OSS messages is stored in the one call OSS message queue backup table 55 on the message handler server 14. Again, this is used for troubleshooting and other suitable purposes.

Once the scheduling messages are inserted into the one call OSS message queue 54, they are processed and sent to the OSS server 132 by the OSS one call message handler watchdog process 112. The OSS one call message handler watchdog process 112 and the one call OSS message queue 54 operate identically to the OSS message handler watchdog process 110 and the OSS message queue 34 described in the exemplary embodiment of the customer call host 20 integration, with the only exception being that the OSS one call message handler watchdog process 112 does not need to rely on Oracle distributed database technology. This is because the OSS one call message handler watchdog process 112 is located on the same physical server (the message handler server 14) as all of the Oracle tables it needs to access.

Message Handler Server (General)

The message handler server 14 is implemented on a UNIX server or other suitable device. For the illustrated UNIX embodiment, message handler server 14 includes Oracle tables, queues and functions, and UNIX processes for communicating between the host 12 and the mobile workforce management system 16. These tables, processes, and other elements form a CAD portion 62 and OSS portion 64 of the message handler system 14. The CAD and OSS portions 62 and 64 share a message handler error table 72. The message handler and host error tables 72 and 46 provide a location for any application to log error conditions for troubleshooting purposes.

Message Handler Server (CAD Portion)

For communicating with a computer-aided design (CAD) server of the mobile workforce management system 16, the message handler server 14 includes a message sent table 80, a message received table 82, a work order status table 84, a work order close table 86, a transaction column table 88, a transaction table 90, a clean process 92, a CAD downlink message handler process 94, a CAD downlink watchdog process 96, a CAD uplink message handler process 98, and a CAD received message parser process 100. Using these tables and processes, the customer call host 20, one call host 22, and other hosts 12 are able to concurrently have work orders dispatched by the CAD server of the mobile workforce management system 16.

In the exemplary embodiment of the invention, the message handler server 14 contains all of the key processes, tables, and entities that make up what will be referred to as the "core" CAD message handler and the "core" OSS message handler. The "core" CAD message handler and the "core" OSS message handler consist of those entities that can be used, with only minor modifications, to interface other host systems to the mobile workforce management system 16. The "core" CAD message handler and the "core" OSS message handler perform many complex operations that are described in extensive detail in the discussions which accompany FIGS. 2 and 6. Therefore, the discussion in this section will serve primarily to illustrate major features and design considerations.

The "core" CAD message handler acts as a single host with respect to the CAD server 130. All CAD work order messages generated by the multiple host systems 12 enter the CAD message handler via the message sent table 80 and are processed for transmission to the CAD server 130 by the CAD downlink message handler process 94. This can include a wide variety of host-initiated messages types, each of which will have a unique transaction ID and message format. Although each such transaction type can have a unique format, several of the entities passed in these messages are unique to all host-initiated messages. For example, all host initiated messages contain the transaction ID, a message ID (a unique message ID is assigned to each message), a date/time stamp, etc. The message sent table 80 has columns for each of these common entities, plus an additional column to hold the uniquely formatted message data. In this manner, the message sent table 80 is able to serve as a universal receptor for host messages from any and all host systems.

As stated, the message sent table 80 receives work order messages received from the many number of multiple host systems 12. When the work order messages are inserted into the message sent table 80, they are marked with a code indicating they are in need of transmission to the CAD server 130 of the mobile workforce management system 16. The insertion of a work order message into the message sent table 80 fires a trigger which sends the message via a DBMS_PIPE to the CAD downlink message handler process 94, which attempts to transmit the work order message to the CAD server 130. If the network 18 or the CAD server 130 is down, the CAD downlink watchdog process 96 will periodically retry sending unsent messages in the message sent table 80 to the CAD server 130 by deleting and re-inserting the messages in the message sent table 80 which serves to re-fire the trigger referred to above. After a work order message is successfully transmitted to the CAD server 130, the work order message is marked as sent in the message sent table 80. Work order messages are deleted from the message sent table 80 by the CAD received message parser process 100, discussed later, upon successful processing of an positive acknowledgment message from the CAD server 130. If a positive acknowledgment message is not received from the CAD server 130, the message will be retained in the message sent table 80 and flagged as being in an error state by the CAD received message parser process 100. Additionally, the CAD received message parser process 100 will insert a code into a reserved column in the message sent table 80 to indicate the specific error condition reported by the CAD server 130.

As discussed above in connection with the message sent and received tables 80 and 82, the CAD downlink message handler process and the CAD uplink message handler processes 94 and 98 communicate between the message handler server 14 and the CAD server 130 of the mobile workforce management system 16. In the exemplary embodiment, the CAD downlink message handler process 94 and the CAD uplink message handler process 98 are 'C' programs that use embedded SQL and Oracle PL/SQL statements and other Oracle functionality and are operable to open UNIX socket connections between the message handler server 14 and the CAD server 130 of the mobile workforce management system 16, perform handshake protocols, and pass messages and responses. It will be understood that messages and responses may be otherwise suitably communicated between the message handler server 14 and the CAD server 130 of the mobile workforce management system 16.

The message sent table 80 includes a message sent backup table 81 that provides an archival listing of all work order messages received by the message handler server 14 from the multiple hosts 12. The message sent backup table 81 is used during CAD server 130 recovery processing for the mobile workforce management system 16. The work order close table 86 is also used during recovery processing to determine work orders that have been completed and need not be resent or rescheduled in the mobile workforce management system 16. Further details concerning recovery processing for the CAD server, use of the message sent backup table 81, and the work order close table 86 are provided below in connection with FIG. 9.

All messages sent out by the CAD server 130 are received by the CAD uplink message handler process 98 and stored in the message received table 82 for additional processing by the CAD received message parser process 100. A message received backup table 83 is provided to store archive copies of the messages received from the CAD server 130. In addition to being useful for troubleshooting, these archived messages are used for certain other processing done by the CAD message handler, such as specialized end-of-day processing.

The messages received from the CAD server 130 generally fall into one of two categories. The first category consists of responses to host-initiated messages. The second consists of messages sent out automatically by the CAD server 130 in response to certain events within the CAD server 130. For example, the CAD server 130 will send out messages to indicate the status of particular work orders each time the work order's state changes. Specific order states may include, but are not limited to, DISPATCHED, EN-ROUTE, ON-SITE, and COMPLETE. Many other "unsolicited" messages can be sent out by the CAD server for a wide variety of events detected by or occurring within the CAD server 130. The message received table 82 is architected in much the same way as the message sent table 80, such that it can serve as a universal receptor for all CAD-initiated messages.

Once messages received from the CAD server 130 are stored in the message received table 82, they are selected and processed by the CAD received message parser process 100. The CAD received message parser process 100 acts upon each of these messages in a particular way, based upon logic as directed by processing codes in the transaction table 90 and upon message formats defined in the transaction column table 88. In this manner, the CAD received message parser process 100 can utilize table-driven logic to perform both generic processing associated with integration of any host system and business process specific processing as required to support the needs of particular host systems. This allows both host independent, system wide, and host dependent roles to be implemented in the message handler and responses processed accordingly. Thus, most of the customization required to implement additional host systems can be confined to the CAD received message parser process 100, the transaction table 90, and the transaction column table 88.

As stated, the CAD received message parser process 100 processes responses stored in the message received table 82. The CAD received message parser process 100 may operate periodically, such as once every minute, to process all responses stored in the message received table 82, or it may be launched in response to insertion of a response message into the message received table 82 or other suitable event. After a response has been processed, the CAD received message parser process 100 deletes the processed message from the message received table 82.

It is a characteristic of the CAD server 130 that a single pair of transaction codes, one for successfully processed host requests and a second for unsuccessfully processed host requests, are used to respond to all host-initiated messages. Furthermore, the CAD server 130 may respond to host-initiated messages in a different sequence than that in which the host-initiated messages were sent to the CAD server 130. Thus, the CAD received message parser process 100 must contain mechanisms for correctly associating each CAD server 130 response message with its correct associated host request message. The method for accomplishing this is described in the discussion of FIG. 2.

The two primary tables updated by the CAD received message parser process 100 are the work order status table 84 and the work order close table 86. When an order is first sent to the CAD server 130 and the CAD server 130 acknowledges successful acceptance of the order, the CAD received message parser process 100 inserts an initial status of PENDING into the work order status table 84. Subsequently, the current status of work orders are updated by the CAD received message parser process 100 upon receipt of the status change messages that are sent out by the CAD server 130 whenever the status of a work order changes. This status information that is stored in the work order status table 84 can be accessed interactively and in real time by any of the host systems 12 and other programs and processes in the integrated resource management system 10.

In like manner, the CAD received message parser process 100 receives critical business information from the CAD server 130 whenever an order reaches the completed state. The CAD received message parser process 100 stores this completion data in the work order close table 86 which can also be accessed interactively and in real time by any of the host systems 12 and other programs and processes in the integrated resource management system 10.

In one embodiment of the invention, a clean process 92 is used to delete no longer needed entries from various tables used by the message handler server 14 and host systems 12. In this embodiment, the clean process 92 is a batch process periodically initiated to remove such entries associated with orders that have been closed for a predetermined number of days. Work orders may be closed due to cancellation, completion, and the like. For example, the clean process 92 may be operated each day during off hours to remove information associated with work orders that have been closed for thirty days from the work order status table 84 and other selected tables. In this embodiment, information on work orders remains indefinitely in the work order close table 86, the work order detail table 36, and the one call order detail table 70. In another embodiment, the work order status table 84 may retain entries rather than purging them with the clean process 92 in order to maintain a more permanent history of the work order states.

Message Handler Server (OSS Portion)

To communicate with an order scheduling system (OSS) server of the mobile workforce management system 16, the message handler server 14 includes an OSS message handler watchdog process 110, an OSS one call message handler watchdog process 112, an OSS message queue 34, a one call OSS message queue 54, an OSS request function 116, an OSS downlink message handler process 118, and an OSS uplink message handler process 120. In the exemplary embodiment, there are five basic types of OSS request messages regardless of the host system 12 involved. These are: appointment book request, appointment reschedule request, appointment delete, appointment availability inquiry, and an OSS system statistics request. Using the described processes, functions, and tables, the customer call host 20, one call host 22, and other hosts 12 are able to concurrently schedule work with the OSS server of the mobile workforce management system 16.

As previously described, scheduling messages may be communicated to the OSS server 132 using either an interactive mode or a non-interactive mode. For non-interactive communications, the host systems 12 insert their OSS request message into the appropriate OSS message queue. For the ARJS 42 and MOSO 40 systems, this is the OSS message queue 34. For the one call host 22, this is the one call OSS message queue 54. The associated OSS message handler watchdog processes 110 and 112 are then either notified of a message being inserted into the respective queue, or they periodically check their respective OSS message queues 34 and 54 to determine if they contain any scheduling messages to be transmitted to the message handler server 14. The OSS message handler watchdog process 110 retrieves any scheduling messages from the OSS message queue 34 and communicates them to the OSS server 132 using the OSS request function 116. The OSS request function 116 is an Oracle stored procedure containing embedded SQL and other Oracle functionality which sends the OSS request message to the OSS downlink message handler process 118 via an Oracle pipe, and receives the OSS response via another Oracle pipe. The OSS request function 116 then returns the results from the OSS server 132 back to the OSS message handler watchdog process 110 which uses the results to update the work order detail table 36 with information such as the appointment ID. The appointment ID and other information stored in the work order detail table 36 are used to process subsequent requests to reschedule or delete appointments. Messages that are successfully processed by the OSS server 132 are then deleted from the OSS message queue 34, with an archive copy retained in the OSS message queue backup table 35, as previously described.

A virtually identical process is used to process non-interactive requests from the one call host 22. In this case, the OSS one call message handler watchdog process 112 retrieves any scheduling messages from the one call OSS message queue 54 and communicates them to the OSS server 132 using the OSS request function 116. The OSS request function 116 then returns the results from the OSS server 132 back to the OSS one call message handler watchdog process 112 which uses the results to update the one call order detail table 70 with information such as the appointment ID. Again, the appointment ID and other information stored in the one call order detail table 70 are needed to process subsequent requests to reschedule or delete appointments. Messages that are successfully processed by the OSS server are then deleted from the one call OSS message queue 54, with an archive copy retained in the one call OSS message queue backup table 55, as previously described.

As discussed previously, the ARJS 42 and MOSO 40 host systems also utilize an interactive mode of communication with the OSS server 132 in order to obtain information in real time to make appointment commitments with customers. In this case, the communication between the host system 42 or 40 and the OSS server 132 is accomplished by having the host system call the Oracle request function 116 directly from within the CICS/COBOL II program using embedded SQL. The ability to call the OSS request function 116 from the ARJS 42 and MOSO 40 applications is provided through Oracle distributed database technology. In this mode of communication with the OSS server 132, the OSS message handler watchdog processes 110 and 112 are not utilized, so it is incumbent on the ARJS 42 and MOSO 40 host systems to make the necessary updates to the work order detail table 36 to record appointment ID's and related information.

In the event that the network 18 or the message handler server 14 or the OSS server 132 is unavailable to service an interactive OSS request, scheduling requests that involve booking appointments, rescheduling appointments, or deleting appointments may be treated as non-interactive scheduling messages by having the host system insert the corresponding scheduling messages into the OSS message queue 34 for later transmission to and processing by the OSS server 132 via the OSS message handler watchdog process 110. Additionally, if customer call center 24 personnel wish to schedule an appointment without regard to the availability of resources, they have the option of entering the request with an "override" indicator. The presence of this override indicator will cause the host system 40 or 42 to bypass potential interactive communications with the OSS server 132 and to process the request in non-interactive mode by inserting it into the OSS message queue 34 for later transmission to and processing by the OSS server 132 via the OSS message handler watchdog process 110.

In the present embodiment of the invention, the OSS uplink message handler process 120 is operable to process responses received from the OSS server 132, and to communicate those responses to the OSS downlink message handler process 118 so that they can be returned to the calling program by the OSS request function 116. Both the OSS downlink message handler process 118 and the OSS uplink message handler process 120 are 'C' programs with embedded SQL statements and other Oracle functionality that are operable to open UNIX socket connections with the OSS server 132, perform handshake protocols, and pass messages to and from the OSS server 132.

Mobile Workforce Management System

The mobile workforce management system 16 includes the CAD server 130, the OSS server 132, a dispatch center 134 with one or more WinDisp terminals 150, and a radio network controller 136 for communicating with multiple Mobile Data Terminals (MDTs) hosting the Mobile Pen Application (MPA) software 160. The MDTs are used by mobile technicians in trucks 138 or other remote resources in the field. The MPA software 160 can also be used on network 18 based PC's to communicate work order information to non-mobile resources located in field offices.

The CAD server 130 portion of the mobile workforce management system 16 is operable to directly communicate with only a single host in that it is designed to only recognize a single host and will process work orders and scheduling messages only from that host. This limitation is overcome by the present invention, wherein the message handler server 14 presents itself to the CAD server 130 as a single host thereby allowing the CAD server 130 to communicate successfully with a plurality of host systems 12.

In the mobile workforce management system 16, work orders are tracked by the CAD server 130, scheduled by the OSS server 132, and dispatched at the dispatch center 134 by dispatchers using the WinDisp application 150. The orders are dispatched to and worked by technicians using trucks 138 in the field equipped with Mobile Data Terminal running the Mobile Pen Application (MPA) software 160. Dispatched work orders are sent to MDTs in the field via the radio network controller 136 where they are processed and worked by the technicians in trucks 138. Information from the technicians on the status of work orders and work order completion details are transmitted back to the CAD server 130 via the radio network controller 136. From the CAD server 130, the status of work orders and work order completion information is then sent to the message handler server 14 to be made available to the multiple host systems 12 primarily via the work order status table 84 and the work order close table 86. As noted previously and as discussed in greater detail in subsequent sections, the CAD received message parser process 100 also uses this status and completion information to update additional tables in the integrated resource management system 10.

In the exemplary embodiment, the mobile workforce management system 16 is Mobile Data Solutions, Inc. (MDSI) Advantex Utility System. It will be understood that other suitable mobile or distributed workforce or resource management systems may be used in connection with the present invention. Such systems may include other or different order scheduling and monitoring systems and equipment.

The CAD server 130 tracks details for work orders received from the hosts 12, presents information to dispatchers using WinDisp terminals 150 at the dispatch center 134 for assignment, communicates with the radio network controller 136, and other connected workstations. The CAD server 130 includes a downlink process 142 for receiving ARJS 42, MOSO 40, and one call 22 work orders from the message handler server 14 and an uplink process 140 for transmitting responses, work order status messages, work order completion information and other information to the message handler server 14. For the exemplary UNIX embodiment, the uplink and downlink processes 140 and 142 may be 'C' program processes that are operable to support the opening of UNIX socket connections between the CAD server 130 and message handler server 14.

The OSS server 132 tracks on an aggregate level which technicians are scheduled to work which days as well as their skills and work areas. Based on this information and previously scheduled work, the OSS server 132 generates a schedule that provides time available on a per skill basis. The OSS server 132 is accessed by the host systems 12 and dispatch center 134 to schedule work as needed.

The OSS server 132 includes a downlink process 146 for receiving scheduling messages from the message handler server 14 and an uplink process 144 for transmitting responses to the scheduling messages back to the message handler server 14. For the exemplary UNIX embodiment, the uplink and downlink processes 144 and 146 may be 'C' program processes that are operable to support the opening of UNIX socket connections between the OSS server 132 and the message handler server 14.

The dispatch center 134 includes a plurality of dispatch terminals running the WinDisp application 150 with which dispatchers access the CAD server 130 and dispatch work to the technicians using the MPA software 160 in trucks 138 in the field. The dispatch center 134 also includes one or more personal computers hosting the one call receiving 50 and one call screening 56 applications. (Note: the one call receiving 50 and one call screening 56 applications are not a part of the mobile workforce management system 16.)

The radio network controller 136 communicates between the CAD server 130 and MDT's running the MPA software 160 in the field. The radio network controller may be a conventional network controller capable of communicating with a mobile or distributed workforce. In the field, each technician in a truck 138 may have a hand-held or truck-mounted system for communicating with the radio network controller 136.

"Core" CAD Message Handler

Figure 2:
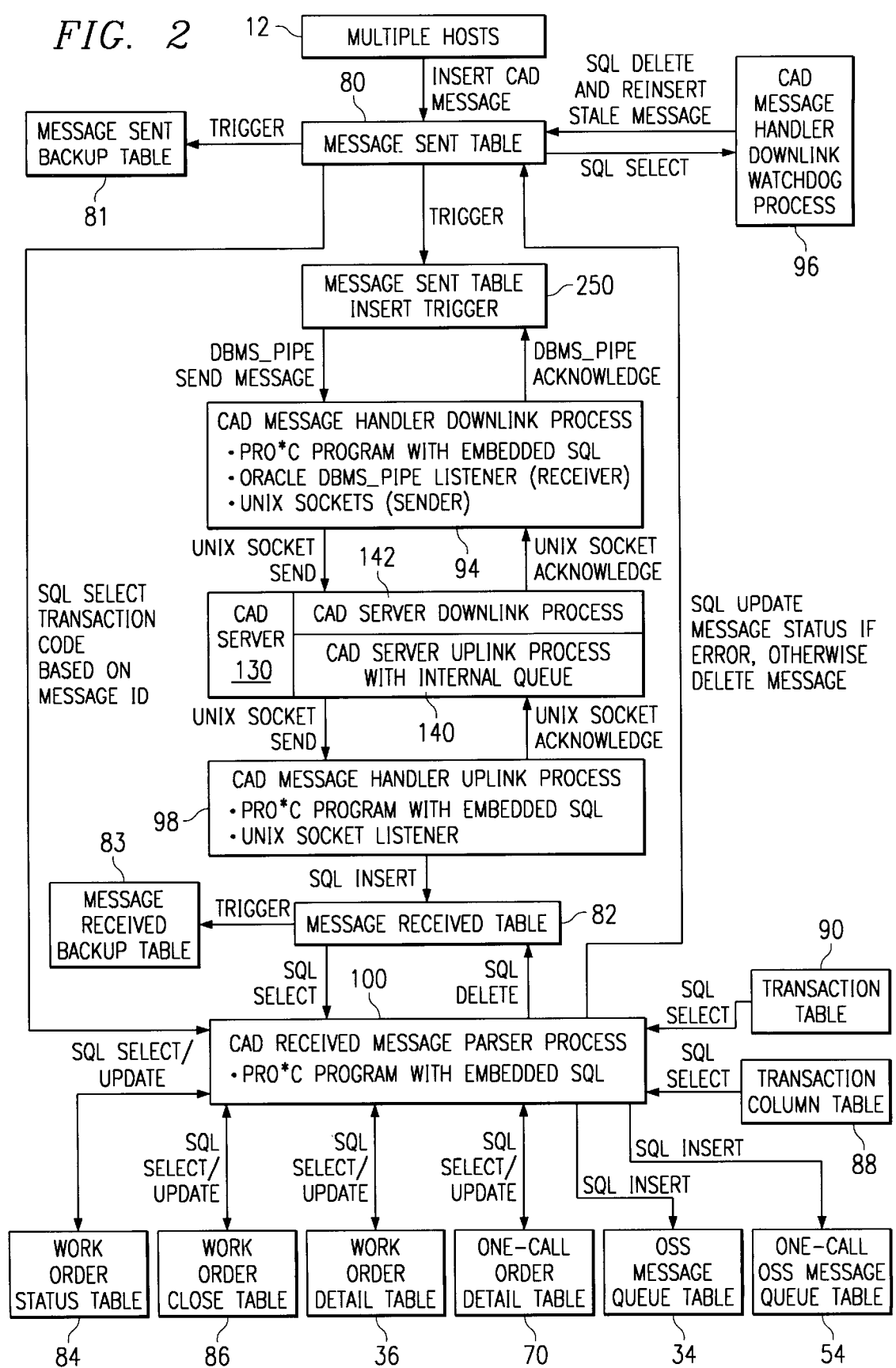
FIG. 2 is an architecture/flow diagram illustrating operation of the "core" CAD message handler.

FIG. 2 is an architecture/flow diagram illustrating the operation of the "core" CAD message handler. The phrase "core" CAD message handler is used to indicate structures, processes, and functions of the message handler server 14 used by all hosts 12 to communicate with the CAD server 130 in the illustrated embodiment and does not indicate that such structures, processes, and functions are critical or necessary to provide communication between a plurality of hosts and a computer-aided dispatch system or other order processing system. The core CAD message handler consists of four background processes and six tables accessed by these processes: a CAD downlink message handler process 94, a CAD uplink message handler process 98, a CAD downlink watchdog process 96, a CAD received message parser process 100, a message sent table 80, a message received table 82, a work order status table 84, a work order close table 86, a transaction table 90, and a transaction column table 88. Using a combination of these tables and technologies such as DBMS_PIPE, database triggers, and UNIX sockets, the CAD message handler allows seamless communications between multiple hosts 12 and the CAD server 130 of the mobile workforce management system 16.

As previously described, CAD messages from a plurality of host 12 are inserted into the message sent table 80 of the message handler server 14. In the message handler server 14, the CAD message handler begins its communication process with a trigger 250 on the message sent table 80. In one embodiment, the trigger 250 fires when a host 12 inserts a message into the message sent table 80 with a message status code of 'A', indicating the record is available for transmitting to CAD server 130. The trigger 250 packs all necessary information including a unique return pipe name into a message and sends the message through a named DBMS_PIPE to the CAD downlink message handler process 94. Meanwhile, another trigger fires to copy the record to the message sent backup table 81. When the CAD downlink message handler process 94, which contains a DBMS_PIPE listener, receives and successfully unpacks all of the data, it sends an acknowledgment back through the return pipe, thus completing the handshake and conversation.

Next, the CAD downlink message handler process 94 creates a UNIX socket and attempts to connect to the downlink 142 listener of CAD server 130. If successful, it sends all necessary data to the CAD server 130. After confirmation from the CAD server 130 that it indeed received all the data, the CAD downlink message handler process 94 issues an SQL update statement to set the record status code to 'S' in the message sent table 80, thus completing the hosts 12 to CAD server 130 data flow. Otherwise, if it fails to send data over to the CAD server 130, the record's status will remain as 'A', and the message is considered stale. In this case, the CAD downlink watchdog process 96, which wakes periodically to look for stale messages, will select the stale message and then delete and re-insert it into message sent table 80 to re-fire the trigger 250 and therefore restart the communication process.

While the CAD server 130 uses the downlink process 142 to receive requests from hosts 12 (via the message handler server 14), it uses the uplink process 140 to send all messages to hosts 12 (again via the message handler server 14). When the CAD server 130 is ready to send a message, its uplink process 140 will attempt to establish a connection with the CAD uplink message handler process 98. If successful, the uplink process 140 transmits its message data; otherwise, it will continuously retry, at a specified frequency, until successful.

The CAD uplink message handler process 98 listens on a pre-configured TCP/IP port for a connection request from the uplink process 140 of the CAD server 130. After receiving data from the CAD server 130, it first inserts the received message into message received table 82 and then transmits back an acknowledgment. An insert trigger then fires to copy the message into the message received backup table 83. If for some reason the CAD uplink message handler process 98 fails to insert the received message into the message received table 82, it will not send an acknowledgment. In this case, the CAD server 130 retains the message in its queue for later transmission. This ensures that no data will be lost due to network 18 or message handler server 14 related problems.

After messages are inserted into the message received table 82, they are ready to be processed by the CAD received message parser process 100. The CAD received message parser process 100 is responsible for processing all messages from the CAD server 130 after they are inserted into the message received table 82. The CAD received message parser process 100 is a 'C' program with embedded SQL and PL/SQL.

The CAD received message parser process 100 wakes up and checks the message received table 82 at a configurable interval, typically every few seconds, and selects for processing any new entries it finds. The CAD received message parser 100 selects each message along with its transaction ID from the message received table 82, and then uses the transaction ID to select from the transaction column table 88 a list of field parsing definitions (offset and byte length in the message). It also uses the transaction ID to select from the transaction table 90 an action code and associated work order status code. The transaction column table 88 may include many entries for each entry in the transaction table 90. Each action code will have an associated block of logic within the CAD received message parser process 100. Based on the action code, information may be selected, updated and/or inserted into the work order status table 84, the work order close table 86, the work order detail table 36, the one call order detail table 70, the OSS message queue table 34, and the one call OSS message queue table 54. The action code is customizable to facilitate different utility's business requirements.

FIGS. 5A–G show a summary table of CAD server 130 transaction IDs and associated actions that have been customized to meet the needs of the particular host systems 12 and business processes associated with the exemplary embodiment of the invention. In particular, FIG. 5A illustrates exemplary CAD responses to host requests, FIG. 5B illustrates exemplary end-of-day notification from the CAD server 130, FIG. 5C illustrates exemplary mobile data terminal related notifications from the CAD server 130, FIG. 5D illustrates exemplary WinDisp related notifications from the CAD server 130, FIG. 5E illustrates exemplary orphan messages from the CAD server 130, FIG. 5F illustrates exemplary message handler generated messages, and FIG. 5G illustrates exemplary ignored messages. It will be understood that other or different messages may be used without departing from the scope of the present invention.

Once messages from the message received table 82 are successfully processed by the CAD received message parser process 100, the messages are deleted from the message received table 82. However, as noted earlier, a copy of each message is retained in the message received backup table 83 for troubleshooting and other suitable purposes.

In the exemplary embodiment of the invention, one example of the use of the message received backup table 83 involves the CAD end-of-day processing function. It is a characteristic of the CAD server 130 that once each night, at a configurable time, all orders within the CAD server 130 are set back to the PENDING state and then redispatched based on the resources scheduled to be available for the coming day. This redistribution is accomplished by an internal CAD server 130 process known as Workload Distribution, which can also be set to run at a configurable time. A limitation of the CAD server 130 is that it cannot be configured in such a way as to guarantee that the work will be redistributed to the same technician who had received it the day before, even if that technician is available to perform the work. In the case of the exemplary utility embodiment, the utility's business process dictated that each order be redispatched to the same technician that had the order the day before. This functionality is accomplished through a customization of the CAD received message parser process 100. In this case, each order set back to pending during end-of-day processing by the CAD server 130 is sent to the message handler server 14 using a transaction ID of SED1. The CAD received message parser process 100 acts as previously described to insert the PENDING status into the work order status table 84 and then delete the SED1 message from the message received table 82. In addition, however, the receipt of the first SED1 message causes the time and date of this first message to be captured and starts an internal timer within the CAD received message parser process 100 to begin a 2-minute countdown. Each subsequent SED1 message received before the timer counts down to zero serves to reset the timer back to 2 minutes. In this way, the timer functions to expire (count down to zero) two minutes after the last SED1 message when the end-of-day processing batch is received. This ensures that the end-of-day cycle is permitted to finish before the next step.

Upon expiration of the 2-minute timer, the CAD received message parser process 100 inserts a new message into the message received table 82 with a transaction code of RED1 (for redistribute). The choice of RED1 is arbitrary; any transaction not issued by the CAD server 130 may be used. In its next processing cycle a few seconds later, the CAD received message parser process 100 detects the RED1 message it inserted there moments before, and begins a process of selecting from the message received backup table 83 all SED1 messages that were received after the previously captured date/time of the first SED1 message. For each such message, the CAD received message parser process 100 obtains the job control number from the SED1 message and then queries the work order status table 84 which contains, among other things, the ID of the technician to which the order had most recently been dispatched. It then uses this information to compose and insert into the message sent table 80 a properly formatted HOD1 message which directs the CAD server 130 to dispatch the order to the identified technician. This process is permitted to finish processing all of the SED1 messages, at which time the vendor-supplied Workload Distribution process is permitted to run on the CAD server 130. The Workload Distribution process will then dispatch any remaining orders up to the limit of available resources, including orders newly available to be worked on the upcoming day. In this manner, the aforementioned limitation of the CAD server 130 is overcome and the utility's business requirements can be satisfied.

Another example of customization of the CAD received message parser process 100 involves the processing of orphan transactions. It is possible for the CAD server 130, under certain circumstances, to transmit orphan messages to the message handler server 14. An orphan transaction is a transaction that is not properly associated with an order in the CAD server 130. These orphan messages can occur in a variety of circumstances when the CAD server 130 encounters a message that is inconsistent with what it believes to be the true state of an order, cannot be fully associated with an order, cannot be fully processed, and the like. For example, the normal progression of an order through its states is Pending, Dispatched, En-Route, On-Site, and Complete. The CAD server 130 only expects a completion message from a Mobile Data Terminal 160 when the order is in the On-Site state. If it receives the completion message when it believes the order is in any state other than On-Site (e.g., Pending) it will consider the completion message to be an orphan message.

An orphan message is retained by the CAD server 130 and transmitted to the message handler server 14 by the CAD server 130 just as any other message, except that it has a unique transaction ID that signifies its orphan status. For example, a normal completion message for a MOSO 40 order will have a transaction ID of TOC1. An orphan completion message for a MOSO 40 order will have a transaction ID of ZOC1.

Orphan messages are processed by the CAD received message parser process 100 in the same general manner as any other message received from the CAD server 130. The difference is that the action code in the transaction table 90 for an orphan completion or other specified type of message will direct the CAD received message parser process 100 to generate a Host Order Cancel message (transaction ID HOX1) for the corresponding order and submit the message to the message sent table 80 for normal processing by the message handler server 14 and the CAD server 130. This is necessary because the CAD server 130 does not properly delete the order from its own work queues when it encounters and processes the orphan completion message; hence, it is necessary for the message handler server 14 to generate the cancel request to prevent the order from being redispatched and/or reworked. A natural consequence of this processing logic is that the CAD received message parser process 100 needs to ignore the cancel command it receives following processing of an orphan completion message for a particular order. Appropriate logic for this circumstance and other similar circumstances is included in the transaction ID-driven logic of the CAD received message parser process 100.

The customized processing steps associated with the SED1 messages and the orphan messages are but two examples of the ease with which the message handler server 14 can be modified to meet the unique needs of any host system 12 integration with the mobile workforce management system 16.

Typically, a significant fraction of the customization required to integrate the CAD message handler with additional host systems can be accomplished by modifying and or adding to the transaction column table 88 and the transaction table 90, and by customizing the action-code specific logic blocks within the CAD received message parser process 100. Because it is customized to meet the exacting requirements of the multiple host systems 12 with which the mobile workforce management system 16 is integrated, it is typical for the CAD received message parser process 100 to access many different Oracle tables in the integrated resource management system 10.

CIS/CAD Integration

Figure 3:
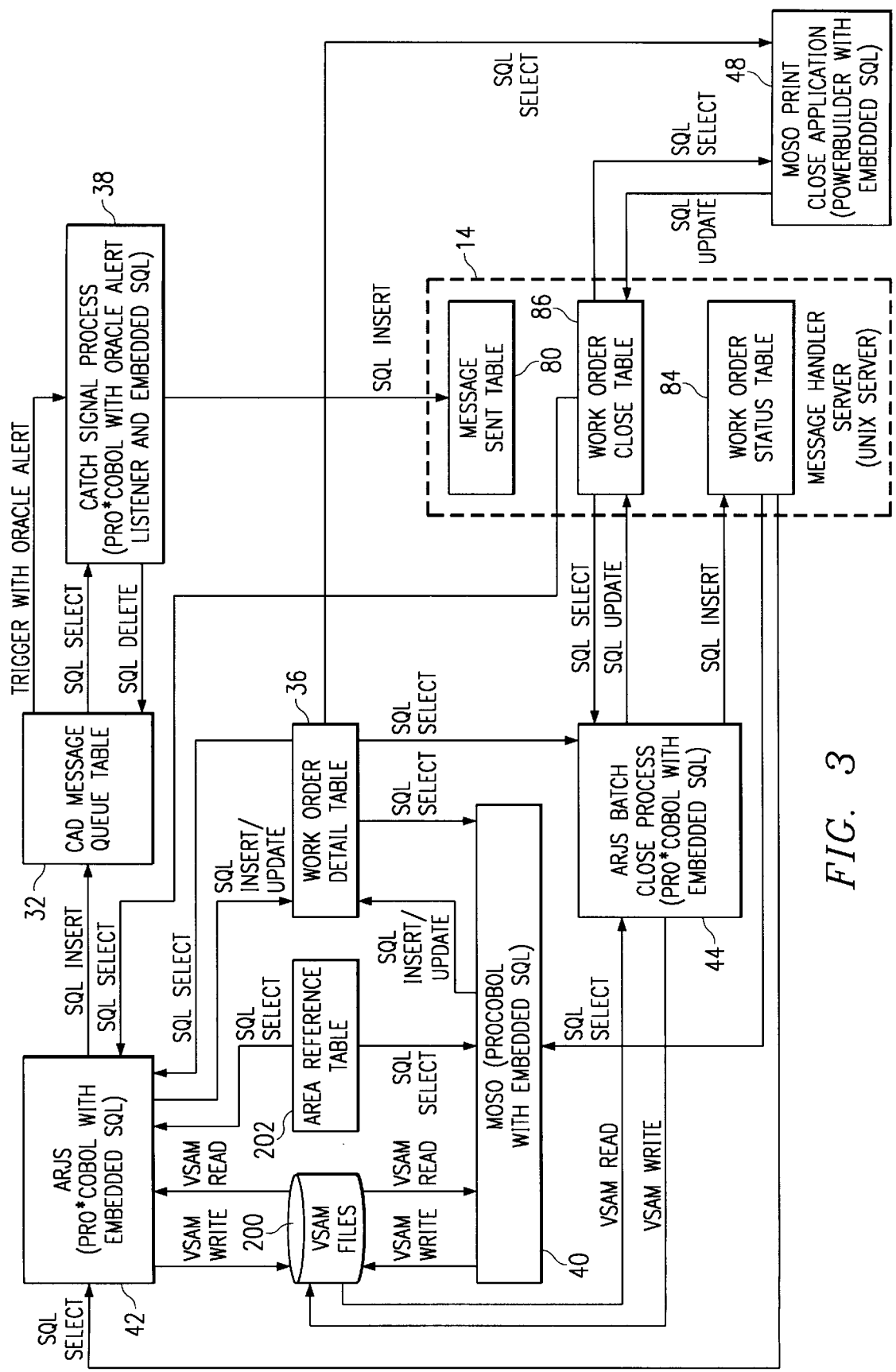
FIG. 3 is an architecture/flow diagram illustrating an integration of a particular Customer Information System (CIS) with the CAD message handler in one embodiment of the invention.

FIG. 3 is an architecture/flow diagram illustrating a computer method for integration between ARJS 42 and MOSO 40 and the message handler server 14, in accordance with one embodiment of the present invention. In this embodiment, the ARJS 42 and MOSO 40 systems are remote from the message handler server 14. ARJS 42 and MOSO 40 are COBOL II CICS/VSAM applications running on a mainframe computer. The message handler server 14 is a set of 'C' processes with embedded SQL and Oracle PL/SQL running on a UNIX server. The entries shown by FIG. 3 reside on the customer call host mainframe 20, except for those in the message handler server 14 and the MOSO print close application 48. Oracle distributed database functionality is used to support Oracle operations from MVS (mainframe) to UNIX and vice-versa.

The ARJS 42 and MOSO 40 applications are work order creation and tracking systems. The integration data flow begins with the consumer calling into the customer call center 24 and the customer service consultant taking the work order information and entering it into either the ARJS 42 or MOSO 40 applications. ARJS 42 and MOSO 40 have a common module that reads the area reference table 202 for a geographic assignment of the service area with the mobile workforce management system 16. The two systems then create the orders in the VSAM files 200 that are part of the base applications. In the same transaction, ARJS 42 and MOSO 40 will insert a record in the work order detail table 36 to capture information that is needed for the mobile workforce management system 16 that is not part of the base application. A record which contains the work order message to be sent to mobile workforce management system 16 via the message handler server 14, will also be inserted into the CAD message queue table 32. The area reference table 202, work order detail table 36, and CAD message queue table 32 are all Oracle/MVS tables. The insertion of the message will fire an Oracle trigger on the CAD message queue table 32 that sends out an Oracle alert (DBMS_ALERT) telling the catch signal process 38 that there is a message to be transmitted to the message handler server 14. The catch signal process 38 is an MVS started task that is constructed as an Oracle PL/SQL stored procedure wrapped by a COBOL II program for error handling and scheduling purposes. The catch signal process 38 listens for the Oracle alert from the trigger. When it receives the alert, it reads all the work order messages from the CAD message queue table 32 and transmits them over to the Oracle/UNIX message sent table 80. The catch signal process 38 utilizes Oracle distributed database functionality with location transparency so that Oracle/MVS and Oracle/UNIX act as one logical database. To make use of the distributed functionality, the catch signal process 38 performs an SQL insert into the message sent table 80. Within the Oracle/MVS and Oracle/UNIX databases, there are DBLinks created for the configuration of the distributed database capabilities. The use of the catch signal process 38 and the Oracle/MVS CAD message queue 32 provides fault tolerance capabilities which permit the ARJS 42 and MOSO 40 applications to continue processing orders and committing them to the CAD message queue 34 in the event of TCP/IP network 18 or message handler server 14 failures. When the TCP/IP network 18 and/or message handler server 14 is again operational, the catch signal process 38 will wake up and transmit work orders to the message sent table 80 through the normal means of operation.

Status and completion information associated with ARSJ 42 and MOSO 40 orders are sent to the CAD message handler and processed by the CAD received message parser process 100. Upon receiving acknowledgment of successful acceptance of an order by the CAD server 130, the CAD received message parser 100 posts an initial status of PENDING by inserting a date/time stamped entry into the work order status table 84. Subsequent status changes will likewise be processed and inserted into the work order status table 84 by the CAD received message parser process 100 whenever status changes occur. Upon notification that an ARJS 42 or MOSO 40 order has been completed or voided by a dispatcher, the CAD received message parser process 100 inserts a FIELD COMPLETE or DISPATCHER VOIDED status into the work order status table 84 and also places the completion details or void information into the work order close table 86.

The ARJS 42 and MOSO 40 systems have the capability to query and display, in real time, the current status and closing information of work orders that have been sent to the mobile workforce management system 16. This is accomplished by querying the work order status table 84 and the work order close table 86. These queries also make use of the distributed database capabilities. Additional work order statuses include, but are not limited to: a work order has been dispatched to a technician, the technician is en-route to the job location, the technician is on-site at the job location, or that the work has been suspended prior to completion after the technician reached the job location.

In the case of a dispatcher void of an ARJS 42 or MOSO 40 order, one additional action is taken by the CAD received message parser 100. In this case, the CAD received message parser 100 queries the work order detail table 36 to determine if an OSS appointment ID exists for the order. If one exists, and the appointment is for a day which is not now in the past, the CAD received message parser 100 will compose a properly formatted OSS appointment delete request and insert it into the OSS message queue table 34 (shown in FIG. 2). This will cause the appointment to be deleted by the OSS server 132 so that the resources will appear available for new orders that are received. It should be noted that this additional processing is necessary when there is no vendor-provided functionality that allows the OSS server 132 to reflect the resource availability impacts associated with the voiding of an order within the CAD server 130. Additional details concerning the processing of OSS orders are presented in the discussions that accompany FIGS. 6, 7, and 8.

The ARJS batch close process 44 is used to close the work orders back in the base ARJS application. This process is constructed in COBOL II with embedded SQL running on the mainframe. It uses the distributed database capabilities to query the work order close table 86 for field completed orders and then closes the orders back in ARJS by updating the VSAM files 200. In addition, the ARJS batch close process 44 queries the work order detail table 36 to retrieve mobile workforce management system 16 specific information and updates the work order status table 84 to show that the order is closed.

The MOSO print close application 48 is used to query the work order detail table 36, work order close table 86 and work order status table 84 to report MOSO closing information. This application is constructed in PowerBuilder and utilizes Oracle SQL*Net and embedded SQL to retrieve information from the identified Oracle tables.

One Call/CAD Integration

FIG. 4 is an architecture/flow diagram illustrating a computer method for integration between one call receiving application 50, the one call screening application 56, and the message handler server 14, in accordance with one embodiment of the present invention. In this embodiment, the one call receiving and screening applications 50 and 56 are remote from the message handler server 14, but they utilize Oracle tables on the message handler server 14 as their primary data stores. The entries illustrated in FIG. 4 reside on the message handler server 14 except for the one call receiving application 50, local database 52, and one call screen application 56 which reside on personal computers running Windows NT or Windows 95. The one call receiving 50 and one call screening 56 applications are PowerBuilder applications running on networked Windows 95 or Windows NT personal computers. Both of the applications use embedded SQL and Oracle SQL*Net to access the Oracle tables on the message handler server 14. In the exemplary embodiment, the local database 52 is a Watcom database; however, any database that can operate in stand-alone mode on the personal computer would be acceptable.

The one call applications 50 and 56 are used to receive, pre-screen, dispatch, track the status of, and display the completion information for work orders that involve the locating and marking of underground facilities. Referring to FIG. 4, the integration data flow begins when a third party "one call" provider sends one or more locate orders to the one call receiving application 50 via a modem-equipped phone line 58. Upon detection of an incoming call, the one call receiving application 50 instructs the modem to answer the call. It then receives the information sent by the one call provider, placing the data first into an internal buffer and then into a table in its local database 52 that is structured to contain the raw, unparsed data strings sent by the one call provider. The utilization of this local database 52 provides a portion of the fault tolerant capability in the exemplary integration scheme. In this case, the local database 52 is operable to store the incoming locate orders even if the one call receiving application 50 is incapable of accessing the message handler server 14 owing to a network 18 or other failure. The one call receiving application 50 contains additional functionality to sound an audible alarm for emergency locate orders and to print the received orders immediately, in their unparsed form, so that they will be available to the locate specialists in the dispatch center 134 even if the remainder of the system is unavailable.

Once the one call receiving application 50 detects the end of an incoming call, it hangs up the modem and then parses the raw data strings into meaningful entities, including but not limited to the request number, the address of the premise to be located, the name of the person requesting the locate, and the type of locate order. It accomplishes this parsing by examining the raw data strings for specific keywords. The keywords, plus additional information needed for the parsing, are contained within another data table in the local database 52. The parsed data are then inserted into yet another table within the local database 52. The data table in the local database 52 used to store the parsed incoming call data is structured almost identically to the one call order detail table 70 illustrated in FIG. 11. The only difference is that the table in the local database 52 contains an additional column that is used to flag whether or not the order has been uploaded to the one call order detail table 70 on the message handler server 14.

After completing the parsing operation, the one call receiving application 50 uses predefined logic to assign default earliest start and latest finish dates/times for the job and to assign the job to a particular CAD geographical area. The determination of earliest start and latest finish dates is based on the type of locate. For example, an URGENT LOCATE will be scheduled to be worked on the day of receipt, while an ADVANCE NOTICE locate will be scheduled to be worked on any day from the next business day up until the day before the DIG DATE associated with the order. The assignment to a CAD geographic area is accomplished by accessing two additional tables within the local database 52. These two tables are local copies of the area reference table snapshot 203 and the rural area reference table 220. These tables are used to look up the corresponding CAD AREA and CAD SUBAREA based on town names from the area reference table or county, township, section IDs from the rural area reference table.

Once the orders have been parsed and updated with the calculated schedule dates and area assignments, the one call receiving application 50 attempts to access the message handler server 14. If successful, it will upload the order details to the one call order detail table 70 and set the uploaded flag in the local database 52. Additionally, it will check the time stamp data on the entries in the area reference table snapshot 203 and the rural area reference table 220 to see whether it is necessary to update its own tables in the local database 52. If an update is indicated, it is performed at this time. If the attempt to access the message handler server 14 is unsuccessful, owing to a network 18 or other remote failure, the one call receiving application 50 will periodically awaken and reattempt the connection and aforementioned processing until successful. The reconnection attempts can occur at any desired and user-definable frequency. In the exemplary embodiment, this occurs once every 3 minutes. The one call receiving application 50 is constructed to allow processing of incoming data being received over the phone line 58 to take priority over all other tasks so as to not risk losing data.

The next step in the integration data flow is for the locate specialists to view the received locate orders and make a determination whether to clear them (meaning they are able to determine without dispatching a worker to the premise that the utility does not have any underground facilities at the location) or to send a worker to the premise to perform the locate work. This step is accomplished with the one call screening application 56. The one call screening application 56 provides a flexible interface which allows the locate specialists to sort and filter the orders in a variety of ways, to view all of the details associated with an order, from its inception to its completion, and to perform the actual scheduling/dispatching of the order via the mobile workforce management system 16.

If the locate specialists wish to clear a one call order, they select a clear option within the one call screening application 56, enter appropriate comments, and then "save" their changes. The one call screening application 56 then updates the one call order detail table 70 with the clearing information and comments, plus the ID of the locate specialist doing the clearing and the date/time at which the order was cleared. In addition the one call screening application 56 inserts a time/date stamped row into the work order status table 84 to indicate a status of CLR.

If the locate specialist instead decides to send the order to the mobile workforce management system 16 to be worked in the field, a different sequence occurs. First, the locate specialists have an opportunity to override the schedule dates and area and subarea assignments that were calculated by the one call receiving application 50. If the area and subarea assignments are changed, the area reference table snapshot 203 and rural area reference table 220 are queried to validate the new area/subarea assignment. If the earliest start date and/or latest end date are changed, the one call screening application 56 will perform a series of logic checks to ensure the utility's business rules for working such orders will not be violated. Next, the locate specialists have an opportunity to modify other information associated with the order and to include additional comments, if desired.

Once the locate specialists are satisfied with the order details, they select the "SEND TO DISPATCH" function within the one call screening application 56. This results in the one call screening application 56 first updating the one call order detail table 70 with the modified order information, and then composing a properly formatted CAD work request message and inserting it into the message sent table 80. At this point, the CAD message handler will function as previously described, posting an initial status of PENDING to the work order status table 84 if the order is processed successfully by the CAD server 130, or an initial status of ERROR if the request is rejected by CAD server 130.

After the orders are sent to the CAD server 130, the regular dispatchers in the dispatch center 134 utilize the WinDisp application 150 to direct and monitor the progress of all orders from the multiple host systems 12, while the locate specialists continue to utilize the one call screening application 56 to monitor and track the status of the one call orders. As discussed in previous sections, notification of status changes of the one call orders will be sent out by the CAD server 130 whenever the order state changes. These notification messages will ultimately be processed by the CAD received message parser process 100 which will post the revised order statuses to the work order status table 84. Each time the one call specialists change to a new screen or refresh the current screen within the one call screening application 56, the application will re-query the order status table and present the current status of each order displayed on the screen. In addition, if the locate specialists are viewing a particular detail screen for a single order, they will be presented with the full history of status changes including the date and time of each change.

In a similar manner, once a locate order is completed in the field or voided by a regular dispatcher, the completion or void data is received from the CAD server 130 and processed by the CAD received message parser 100. In this case, the CAD received message parser 100 inserts a row into the work order status table 84 to show a status of FIELD COMPLETE or DISPATCHER VOIDED, as appropriate, and then updates the corresponding row in the one call order detail table 70, thus making both the completion or void status and the completion or void details available to the one call specialists using the one call screening application 56. In addition, the CAD received message parser 100 also places an entry containing the completion or void information into the work order close table 86. This step is not necessary to support the normal day-to-day business process, since all one call information is viewed by the one call screening application 56 using the work order status table 84 and the one call order detail table 70. However, placing this information in the work order close table 86, along with the completion and void information for ARJS and MOSO 40 orders, provides a comprehensive repository which can be used for a variety of statistical reporting and process improvement purposes.

In the case of a dispatcher void of a one call order, one additional action is taken by the CAD received message parser. In this case, the CAD received message parser process 100 queries the one call order detail table 70 to determine if an OSS appointment ID exists for the order. If one exists, and the appointment is for a day which is not now in the past, the CAD received message parser process 100 will compose a properly formatted OSS appointment delete request and insert it into the one call OSS message queue table 54 (shown in FIG. 2). This will cause the appointment to be deleted by the OSS server 132 so that the resources will appear available for new orders that are received. It should be noted that this additional processing is necessary when there is no vendor-provided functionality that allows the OSS server 132 to reflect the resource availability impacts associated with the voiding of an order within the CAD server 130. Additional details concerning the processing of OSS orders are presented in the discussions that accompany FIGS. 6, 7, and 8.

OSS Message Handler Server

Figure 6:
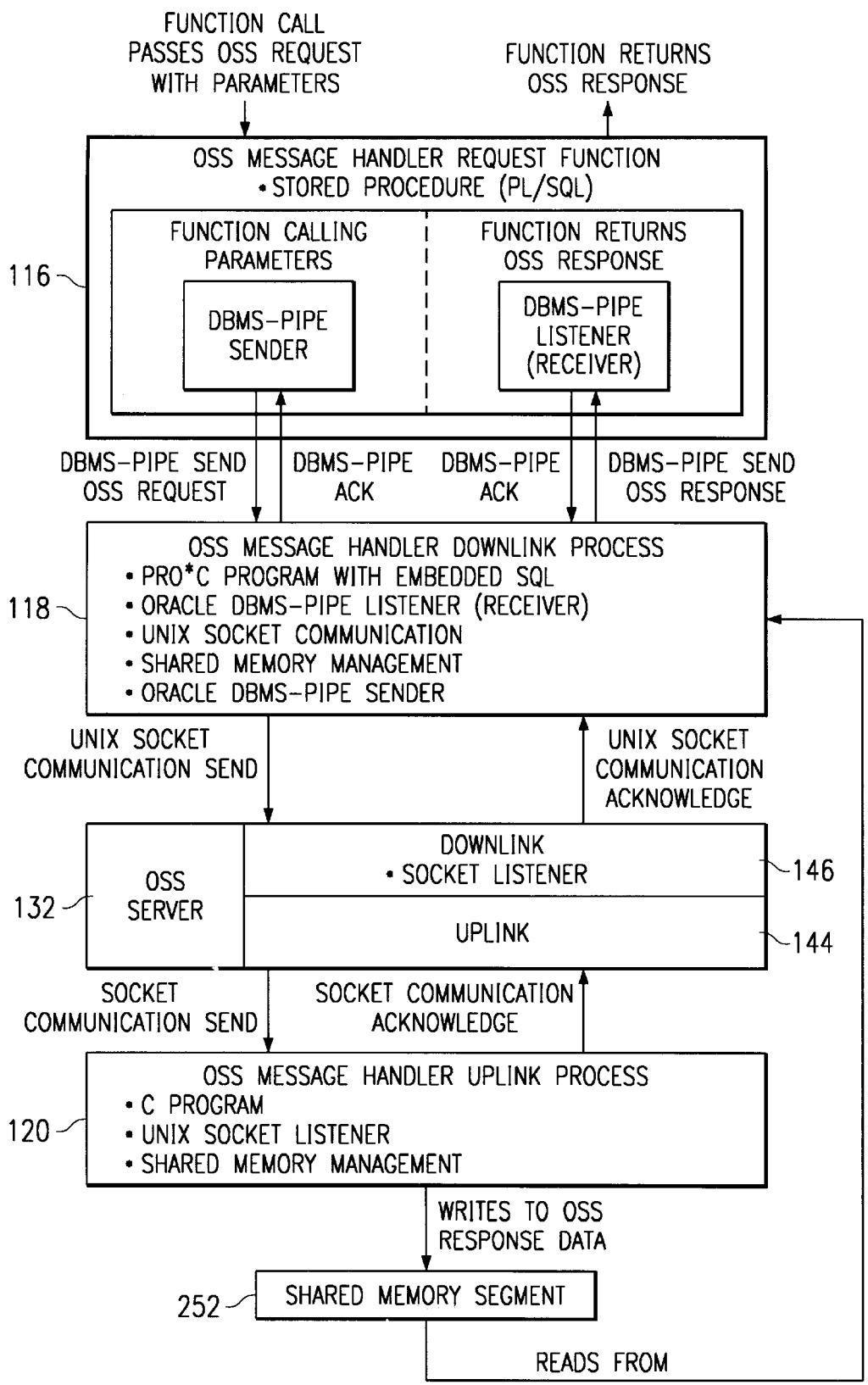
FIG. 6 is an architecture/flow diagram illustrating operation of the "core" OSS message handler in one embodiment of the invention.

FIG. 6 is an architecture/flow diagram illustrating the operation of the "core" OSS message handler. The phrase "core" OSS message handler is used to indicate structures, processes, and functions of the message handler server 14 used by the hosts 12 to communicate with the OSS server 132 in the illustrated embodiment and does not indicate that such structures, processes, and functions are critical for or necessary to provide communication between a plurality of hosts and a scheduling system or other order processing system. The core OSS message handler consists of an Oracle stored procedure known as the OSS request function 116, the OSS downlink message handler process 118, the OSS uplink message handler process 120, and a shared memory segment 252. Similar to the CAD message handler, the OSS message handler also employs DBMS_PIPE and UNIX sockets to facilitate communication between hosts 12 and the OSS server 132. Because the OSS server 132 communicates in synchronous mode using two half-duplex links, the OSS message handler communicates with the OSS server 132 in request/response conversational dialogs. Depending on the business requirement, these dialogs can, from the host system's perspective, be either interactive or non-interactive.

The OSS request function 116 is a stored procedure, which first performs a DBMS_PIPE send request message and handshaking protocol with the OSS downlink message handler process 118, and then listens on a DBMS_PIPE to receive the response message from the OSS downlink message handler process 118. In accomplishing this, the OSS request function 116 also performs a handshaking protocol to ensure the successful receipt of the response message.

The OSS downlink message handler process 118 is a background process which receives a message from the OSS request function 116, creates a UNIX socket to send the message to the downlink process 146 of the OSS server 132, fetches the response message from a shared memory segment 252 (where it is placed by the OSS message handler uplink process 120), and finally sends the response message back to the OSS request function 116.

The OSS uplink message handler process 120 is a background process which listens on a pre-configured TCP/IP port, handles handshaking protocol with the uplink process 144 of the OSS server 132, receives a message, unwraps the lower level packet header information, and writes the response from the OSS server 132 into the shared memory segment 252 for the OSS downlink message handler process 118 to fetch.

Before a dialog can begin, the OSS server 132 requires some initialization to establish a session between itself and the OSS message handler. At start up, before it begins listening on the DBMS_PIPE for any messages from OSS request function 116, the OSS downlink message handler process sends out a request to the OSS server 132 to establish a session. The OSS server 132 responds by assigning a unique session ID for all subsequent dialogs. When the OSS message handler is to shut down, the OSS downlink message handler process 118 sends a request to the OSS server 132 to terminate the established session.

A typical interactive dialog starts with a host 12 calling the OSS request function 116 and passing a number of parameters: OSS transaction ID, message ID, customer service representative ID, date, time, and message data. The OSS request function 116 packs all the data, appends a return pipe name, and sends the data to the OSS downlink message handler process 118, which listens on a named DBMS_PIPE. After receipt of acknowledgment from the OSS server 132, the OSS request function 116 starts a timer and listens, for a configurable amount of time, on another DBMS_PIPE for the response from the OSS server 132. If no response is received within the specified amount of time, the OSS request function 116 returns a null string back to the calling host 12.

During the time the OSS request function 116 is waiting for the response from the OSS server 132, the OSS downlink message handler process 118 receives the request message from the DBMS_PIPE. It then creates a UNIX socket and tries to connect to the downlink process 146 of OSS server 132. If successful, the OSS downlink message handler process 118 sends the request message to the OSS server 132. After receiving confirmation of receipt from OSS server 132, the OSS downlink message handler process 118 then waits for control of the shared memory segment 252, where the OSS uplink message handler process 120 will copy the response from the OSS server 132. Next, when the OSS downlink message handler process 118 successfully copies the response from the shared memory segment 252, it packs the response and sends the resulting message back to the OSS request function 116, which listens for the message on the aforementioned named DBMS_PIPE.

As described above, the OSS uplink message handler process 120 listens for a connection request from the uplink process 144 of OSS server 132. When a connection is established, it receives the response from the OSS server 132 and sends back a confirmation. After getting control of the shared memory segment 252, the OSS uplink message handler process 120 copies the unwrapped OSS server response message to the shared memory segment 252 and then notifies the OSS downlink message handler process 118 to fetch it.

To facilitate non-interactive communications between host systems 12 and the OSS server 132, the OSS message handler provides a queuing mechanism similar to that employed by the CAD message handler. When a host 12 wishes to communicate with the OSS server 132 in this fashion, it inserts its request message into an OSS message queue table and lets an OSS watchdog process call the OSS request function 116. In this particular embodiment of this invention, the OSS message handler provides an OSS message queue table 34 and an OSS message handler watchdog process 110 for the CIS hosts (ARJS 42 and MOSO 40 and), a one-call OSS message queue table 54, and an OSS one call message handler watchdog process 112 for the one call host 22.

When host systems 12 interact with the OSS server 132 in the non-interactive mode, the host systems 12 do not directly receive or process the OSS server's response. For this reason, it is incumbent on each OSS message handler watchdog process to post the information received from the OSS server 132 to the proper integration tables and to perform cleanup of the appropriate OSS message queue. In the exemplary embodiment, the OSS message handler watchdog process 110 updates the appointment IDs in the work order detail table 36 and deletes successfully processed messages from the OSS message queue table 34. Similarly, the OSS one call message handler watchdog process 112 updates the appointment IDs in the one call order detail table 70 and deletes successfully processed messages from the one call OSS message queue table 54. Additional details concerning integration of the OSS server 132 with the ARJS 42, MOSO 40, and one call 22 hosts are described in later sections.

CIS/OSS Integration

Figure 7:
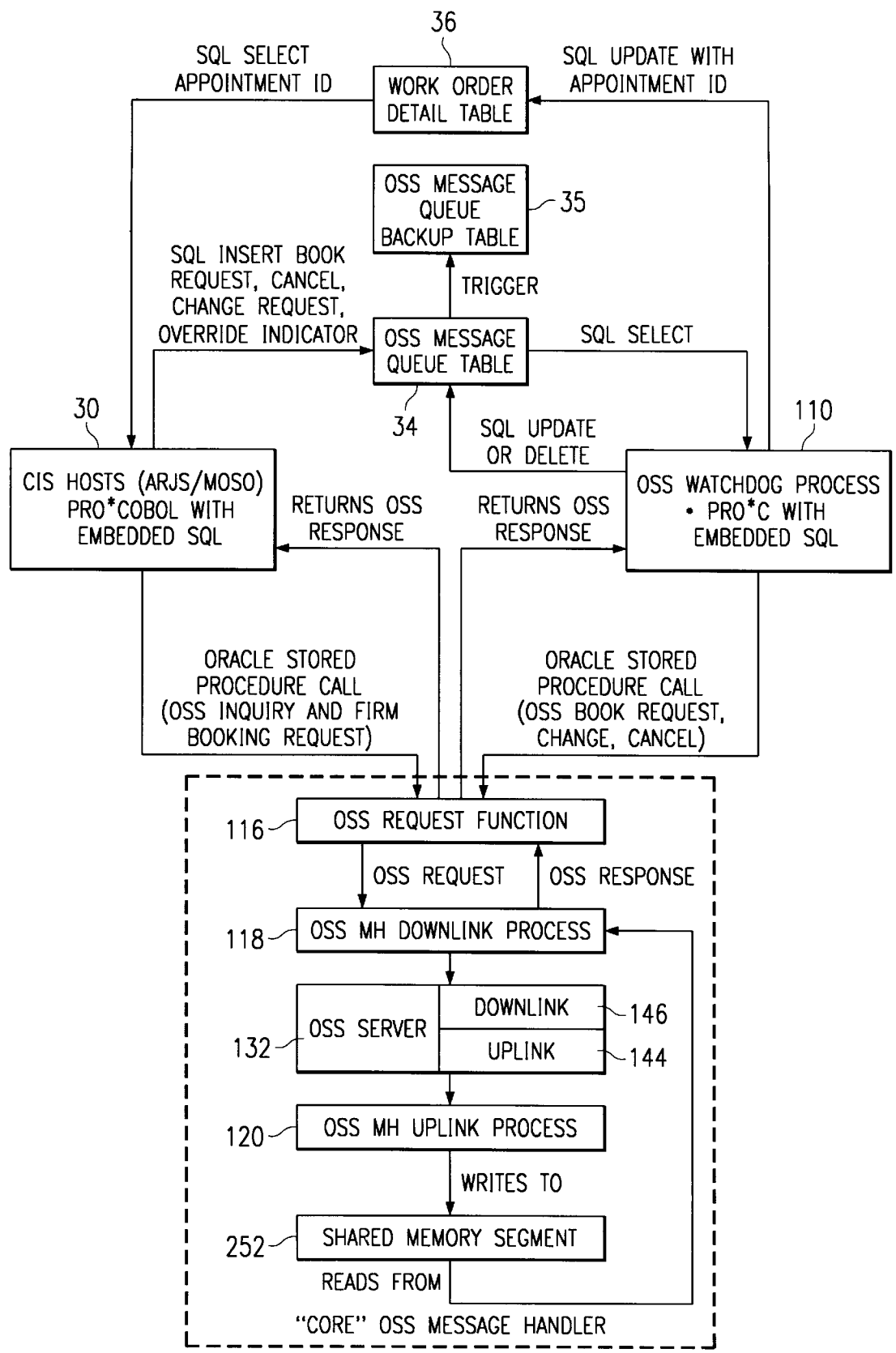
FIG. 7 is an architecture/flow diagram illustrating the integration of a particular Customer Information System (CIS) with the OSS message handler in one embodiment of the invention.

FIG. 7 is an architecture/flow diagram illustrating a computer method for integration between CIS hosts 30 (ARJS 42 and MOSO 40) and the "core" OSS message handler, in accordance with the one embodiment of the present invention. In this embodiment, the CIS host systems 42 and 40 are remote from the message handler server 14. ARJS 42 and MOSO 40 are COBOL II CICS/VSAM applications running on a mainframe computer and the message handler server 14 is a set of 'C' processes with embedded SQL and Oracle PL/SQL running on a UNIX server. The entries illustrated in FIG. 7 reside on the message handler server 14, except for the CIS 30, OSS message queue table and backup 34 and 35, and work order detail table 36 which reside on the customer call host mainframe 20.

The ARJS 42 and MOSO 40 applications have the capability to inquire about available workforce resources and book those resources through both interactive and non-interactive modes of integration with the OSS server 132. The interactive integration is accomplished through the use of an Oracle PL/SQL stored function known as the OSS request function 116. The OSS request function 116 resides on an Oracle/UNIX instance on the message handler server 14. The function is called from ARJS 42 and MOSO 40 through the use of a stored function/procedure call which utilizes Oracle distributed database functionality. The call to the OSS request function 116 serves both to pass the OSS request message to the OSS server 132 and to return the response from the OSS server 132 back to the calling program. A typical OSS request might be to ask for a list of dates on which sufficient resources exist to perform a particular type of job in a given geographical work area. The response from the OSS server 132 would be a list of available dates and times. The ARJS 42 or MOSO 40 user would then have the ability to choose an appointment date and time from among the choices provided, and have the system then send a second message via the OSS request function 116 to book the appointment. When the host system 42 or 40 receives acknowledgment that the OSS server 132 has successfully processed its request, the host system 42 or 40 updates the work order detail table 36 to record the appointment ID and other pertinent information concerning the appointment. If an appointment is canceled (or if no appointment is ever made), its appointment ID is set to 0, which signifies to any inquiring process that no appointment exists.

The other mode of OSS integration, the non-interactive mode, is typically utilized to unconditionally book an appointment whether or not resources are available, to override the rejection of an appointment request, or to cancel an appointment. It is also used to book an appointment when the OSS request function 116 cannot be called successfully due to failure of the network 18, the message handler server 14, or the OSS server 132. This provides fault tolerance to the integration design by allowing customer call center 24 personnel to continue to book appointments through ARJS 42 and MOSO 40 when the network 18 is unavailable or other failures render the OSS server 132 unavailable.

To send an OSS request via the non-interactive method, the host system 42 or 40 simply inserts a record into the OSS message queue table 34 to be processed a short time later by the OSS message handler watchdog process 110. Upon insertion of the request message in the OSS message queue table 34, a trigger fires and creates a backup copy of the message in the OSS message queue backup table 35 for troubleshooting and other suitable purposes. When employing the non-interactive method, the host system 40 or 42 does not wait for a response. In this case, the OSS message handler watchdog 110 will update the work order detail table 36 as necessary to record the appointment ID and other pertinent information.

The OSS message handler watchdog process 110 used to process non-interactive requests to the OSS server 132 is constructed in 'C' with embedded SQL (Pro*C) calls to Oracle. The OSS message queue table 34 resides on Oracle/MVS and distributed database functionality is used between Oracle/UNIX and Oracle/MVS to allow the OSS message handler watchdog process 110 to query this table. The OSS message handler watchdog process 110 runs on the UNIX message handler server 14 and can be scheduled to be run at any desired frequency. When it runs, it queries the OSS message queue table 34 for any OSS messages to be processed. If there are messages to process, the OSS request function 116 (same function as used in the interactive integration) is called by the OSS message handler watchdog process 110 to pass the OSS message request to the OSS server 132 and to return the response from the OSS server 132. If the request is processed successfully, the OSS message handler watchdog process 110 updates the work order detail table 36 with the appointment ID and other pertinent information and then deletes the message from the OSS message queue 34. If the request is not processed successfully, the appropriate row in the OSS message queue table 34 is updated with information describing the nature of the failure.

All non-interactive OSS requests are initially sent to the OSS server 132 as firm booking requests without invoking the override indicator. If the firm booking request is rejected because, for example, there are not enough resources to work the order on the requested day, then the OSS message handler watchdog process 110 sends the request a second time with the override indicator set. This approach of first sending the request without override and then resending it with override in the event the first attempt fails may be necessary to overcome a limitation in the OSS server 132 which can prevent the appointment from being booked against the preferred skill set when the override indicator is set.

One Call/OSS Integration

Figure 8:
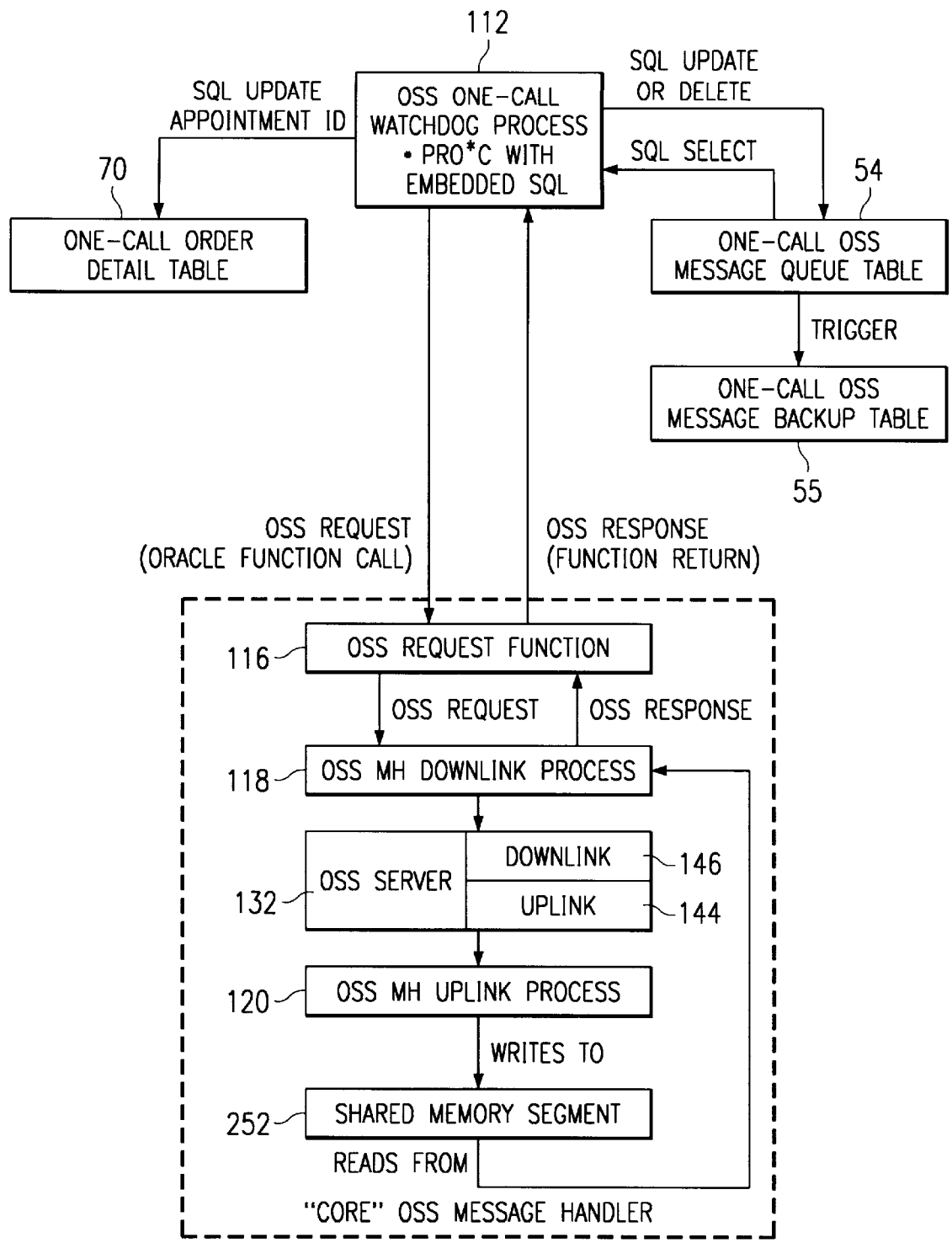
FIG. 8 is an architecture/flow diagram illustrating an integration of a particular One Call (digger's hotline) System with the OSS message handler in one embodiment of the invention.

FIG. 8 is an architecture/flow diagram illustrating a computer method for integration between one call host 22 and the "core" OSS message handler, in accordance with one embodiment of the present invention. In this embodiment, the one call host systems 50 and 56 are remote from the message handler server 132, but they utilize Oracle tables on the message handler server 14 as their primary data stores. The entries illustrated by FIG. 8 reside on the message handler server 14.

The OSS one call message handler watchdog process 112 is utilized to process all one call OSS requests through the non-interactive integration method described previously. This is a very similar process to the OSS message handler watchdog process 110 described in FIG. 7. The OSS one call message handler watchdog process is constructed to run on UNIX utilizing 'C' with embedded SQL and Oracle PL/SQL.

The OSS one call message handler watchdog process 112 used to process non-interactive requests to the OSS server 132 runs on the UNIX message handler server 14 and can be scheduled to be run at any desired frequency. For the exemplary embodiment, the OSS one call message handler watchdog process runs once every 30 seconds. When the OSS one call message handler watchdog process 112 runs, it queries the one call OSS message queue table 54 for any OSS messages to be processed. The one call OSS message queue table 54 resides in the Oracle/UNIX instance on the message handler server 14. If there are requests to be processed, the OSS one call message handler watchdog process 112 calls the OSS request function 116 (same function that is used in the interactive integration) to pass the OSS message request to the OSS Server 132. The OSS request function 116 is an Oracle stored function/procedure call that returns the OSS response indicating whether or not the request was processed successfully. If the request was not processed successfully, the OSS one call message handler watchdog process 112 updates the one call OSS message queue table 54 with information indicating the nature of the error. If the request is processed successfully, the OSS one call message handler watchdog process 112 updates the one call work order detail table 70 with the appointment ID and other relevant information returned by the OSS server 132. This information may be required at a later time in connection with requests to cancel or change the OSS appointment.

All one call OSS requests are initially sent to the OSS server 132 as firm booking requests without invoking the override indicator. If the firm booking request is rejected because, for example, there are not enough resources to work the order on the requested day, then the OSS one call message handler watchdog process 112 sends the request a second time with the override indicator set. This approach of first sending the request without override and then resending it with override in the event the first attempt fails may be necessary to overcome a limitation in the OSS server 132 which can prevent the appointment from being booked against the preferred skill set when the override indicator is set.

CAD Recovery Processing

FIG. 9 is a flow diagram illustrating details of the recovery processing for the CAD system 130 of the mobile workforce management system 16, in accordance with one embodiment of the present invention. It will be understood that the method may be used for other systems employing a message handler for communicating between a plurality of hosts and a computer-aided dispatch system.

Referring to FIG. 9, the method begins at step 400 in which the CAD server 130 is shut down upon a failure condition to allow recovery processing. Next, at step 402, the CAD portion of the message handler server 14 is also shut down. The catch signal process 38 is shut down at step 404 and dispatchers at the dispatch center 134 are instructed to refrain from using the one call screening application to send orders to the mobile workforce management system 16. These steps are taken in order to prevent new messages from being sent by either the customer call host 20 or the one call host 22 to the message handler server 14 until such time as the CAD server 130 is properly restored and resynchronized with the host systems 12.

Proceeding to step 406, the CAD server 130 is restored from a previously saved backup version. In one embodiment, a new backup version of the CAD server 130 is saved daily to minimize data that needs to be reconstructed in the event of a CAD server 130 failure. As described in more detail below, the time stamp for the backup version is used to determine which messages were sent to the CAD server 130 subsequent to the time of the restored version and thus need to be resent or otherwise accounted for in reconstructing the CAD server 130 to a current state.

Next, at step 408, field communications are disabled. In one embodiment, field communications are disabled by temporarily redefining the TCP/IP port settings which the CAD server uses to listen on the network 18 for communications originating from radio-based and LAN-based users of the Mobile Pen Application software 160.

At this point, the CAD server 130 has been restored to a previously saved state and outside communications with the hosts 12, technicians, and other field users using the Mobile Pen Application software 160 in the field have been disabled.

Proceeding to step 410, the CAD server 130 is started. The CAD portion of the message handler server 14 is started at step 412. At step 414, the CAD server 130 is set to a known state by dispatchers using the WinDisp application 150. The dispatchers first set all work orders in the CAD system 130 to a pending status and force all field technicians to a logged off status. (Note: Although the communication with field technicians has been disabled and they cannot in reality be logged in at this time, the CAD server 130 may have been restored to a state where it had technicians logged in and it may still reflect that state.)

Next, at step 416, all entries in the message sent table 80 are deleted manually or by other suitable means. These messages are not needed since a copy of each of them resides in the message sent backup table 81. At step 418, field communications to radio-based and LAN-based users of the MPA software 160 are restored. Once this occurs, any work order status and completion messages that are stored on the radio-attached and LAN-attached computers running the MPA software can be transmitted to the CAD server 130. All such messages will be seen by the CAD server 130 as orphan messages. This is because the CAD server has previously had all of its work orders set back to the pending state; consequently the CAD server 130 does not expect any of the field MPA units to have valid orders on them and it therefore interprets the messages as orphan messages. However, since processing of orphan messages is handled by the normal functioning of the CAD received message parser 100, no special actions are required at this time to ensure that these orphan messages will be processed properly, and at step 420, the orphan messages that are so received from the field are processed.

Proceeding to step 422, the CAD message handler server 14 deletes from the CAD server 130 any pending work orders that were completed or canceled subsequent to the time stamp of the restored version. This is accomplished using a manually initiated but pre-defined PL/SQL procedure that interrogates the work order status table 84 to find the host job control numbers for all orders completed or canceled after the time of the backup, composes a properly formatted CAD message to cancel the order, and then inserts the cancel message into the message sent table 80 for normal processing by the CAD message handler server 14 and the CAD server 130. This will prevent the dispatchers or the CAD server 130 itself from attempting to re-dispatch these already completed or already canceled orders.

Next, at step 424, the message handler server 14 resends all work order messages from the host systems 12 to the CAD server 130 that were sent subsequent to the restored version. This is accomplished using a second manually initiated but pre-defined PL/SQL procedure that acts upon each message stored in the message sent backup table 81 with a time stamp after the time of the restored version. These messages are sent in their original order as determined by selecting the messages from the message sent backup table 81 and sorting them by their time stamps. In the process of resending these messages, the work order status table 84 is again interrogated to determine if the associated work orders were already completed or canceled subsequent to the time of the restored version. Messages that were originally sent subsequent to the restored version but later canceled or completed are not resent as they do not need to be redispatched.

Step 424 leads to the end of the process by which the CAD server 130 is restored and synchronized with the message handler server 14 and the host systems 12 of the integrated resource management system 10.

OSS Recovery Processing

FIG. 10 is a flow diagram illustrating recovery processing for the OSS server 132 of the mobile workforce management system 16, in accordance with one embodiment of the present invention. It will be understood that the method may be used for other systems employing a message handler for communicating between a plurality of hosts and a scheduling system.

Referring to FIG. 10, the method begins at step 450 in which the OSS portion of the message handler server 14 is shut down upon a failure condition in the OSS server 132 to allow recovery processing. Next, at step 452, the OSS server 132 is also shut down. At step 454, the OSS server 132 is restored from a saved backup version. In one embodiment, a new backup version of the OSS server 132 is saved daily to minimize data that needs to be reconstructed in the event of OSS server 132 failure.

Proceeding to step 456, the restored OSS server 132 is started. At step 458, the internal database of the OSS server 132 is manually interrogated using SQL to determine the highest appointment ID assigned by the OSS server at the time the backup version was created. For purposes of this description, this appointment ID will be referred to as the starting appointment ID.

Proceeding to step 460, the various order detail tables in the integrated resource management system are manually interrogated using SQL to determine the highest appointment ID that had been assigned by the OSS server 132 prior to the failure. For the exemplary embodiment, this would involve interrogating the work order detail table 36 for the customer call host 20 applications, and the one call order detail table 70 for the one call 22 application. For purposes of this description, this appointment ID will be referred to as the ending appointment ID.

The next step in resynchronizing the OSS server 132 the message handler server 14 and the multiple host systems 12 is to generate OSS messages that will serve to rebook all of the appointments that had previously been assigned with appointment IDs greater than the starting appointment ID and up to and including the ending appointment ID. In the exemplary embodiment, this is accomplished with two manually initiated but pre-defined PL/SQL procedures, one for each of the host systems 20 and 22. These procedures select order details needed to generate appointment booking requests from the appropriate order detail table, generate properly formatted OSS appointment request messages for all orders with appointment IDs greater than the starting appointment ID and less than or equal to the ending appointment ID (unless the associated orders have already been completed or canceled as determined by interrogating the work order status table 84), and insert these requests into the appropriate OSS message queue table. For the exemplary embodiment, this would be the OSS message queue 34 for the customer call host 20 applications and the one call OSS message queue 54 for the one call 22 application. All of the processing associated with inserting these rebooking requests into the appropriate OSS message queue is accomplished in step 462.

Once the rebooking requests have been generated and inserted into the appropriate queue, the OSS message handler watchdog processes are started in step 464. For the exemplary embodiment, this includes the OSS message handler watchdog process 110 and the OSS one call message handler watchdog process 112. Starting these processes completes the processing of the rebooking requests inserted in the OSS message queues in step 462.

Step 464 leads to the end of the process by which the OSS server 132 is restored and synchronized with the message handler server 14 and the host systems 12 of the integrated resource management system 10.

Data Model for the Exemplary Embodiment

Figure 11B:
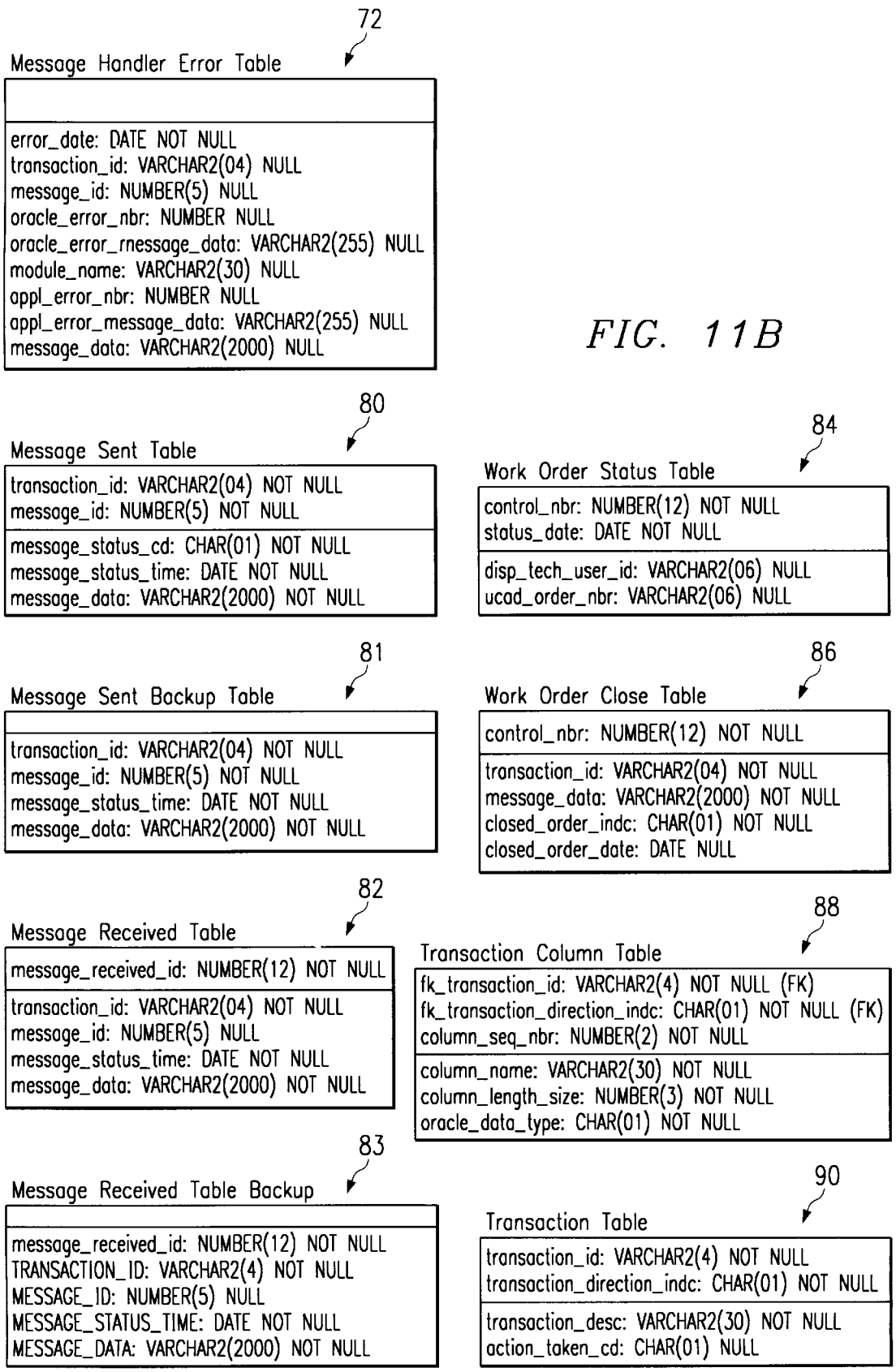

FIGS. 11A–C present the data model used by the host systems and the CAD and OSS message handlers in the exemplary embodiment of the invention. In particular, FIG. 11A illustrates exemplary Oracle/MVS database schema for CIS host integration, FIG. 11B illustrates exemplary Oracle/UNIX database schema for "core" message handler, and FIG. 11C illustrates exemplary Oracle/UNIX database schema for one call integration. Those skilled in the art may find that examination of the structure and content of the key tables can enhance their understanding of the preceding descriptions. It will be understood that other or different database tables and schema may be used without departing from the scope of the present invention.

Although the present invention has been described with several embodiments, various changes and modifications may be suggested to one skilled in the art. For example, other technologies for transmitting and queuing messages across boundaries could be substituted for the distributed database functionality and native pipe and alert features. Such a system would need integration into a table driver or other suitable process on the message handler to allow for business rules to be implemented for each host. It is intended that the present invention encompass such changes and modifications as fall within the scope of the appended claims.

What is claimed is:

1. A recovery method for a resource management system having a message handler for communicating orders from a plurality of disparate hosts to an order processing system for assignment to remote resources, comprising:

shutting down the order processing system;

shutting down the message handler;

generating a restored order processing system by replacing a current version of the order processing system with a previously saved version;

restarting the restored order processing system;

restarting the message handler;

setting each order in the restored order processing system to pending;

identifying orders in the restored order processing system that were closed subsequent to a time of the previously saved version;

deleting the closed orders from the restored order processing system;

identifying orders in the message handler that were transmitted from the message handler to the order processing system subsequent to the time of the previously saved version;

identifying the subsequently transmitted orders that remain open in the message handler; and transmitting the subsequently transmitted orders that remain open in the message handler to the restored order processing system for assignment to the remote resources.

2. The method of claim 1, wherein the subsequently transmitted orders that remain open in the message handler are transmitted to the restored order processing system in their original order.

3. The method of claim 1, further comprising:

storing in a table in the message handler each order transmitted from the message handler to the order processing system; and identifying from the table the subsequently transmitted orders.

4. The method of claim 1, further comprising:

storing in the message handler a status of each order transmitted from the message handler to the order processing system; and using the status of the subsequently transmitted orders to identify those that remain open.

5. The method of claim 1, wherein the remote resources include a mobile workforce.

6. The method of claim 1, wherein the order processing system is a computer-aided dispatch system.

7. The method of claim 1, further comprising:

in the restored order processing system, receiving from the remote resources a response to an assignment;

determining whether the response is properly associated with an order in the restored order processing system;

if the response is properly associated with an order in the restored order processing system, including with the response a normal transaction ID of the order;

if the response is not properly associated with an order in the restored order processing system, including with the response a predefined orphan ID;

transmitting the response to the message handler;

at the message handler, associating the response with a corresponding order previously sent to the order processing system;

in response to at least the orphan ID, generating a message operable to delete the corresponding order from the restored order processing system; and transmitting the message to the restored order processing system.

8. The method of claim 7, further comprising in response to the orphan ID and a specified type of response, generating the message and transmitting the message to the restored order processing system.

9. The method of claim 8, wherein the specified type of response is an order complete response.

10. A recovery method for a resource management system having a message handler for communicating scheduling messages from a plurality of disparate hosts to an order scheduling system for assignment, comprising:

shutting down the order scheduling system;

shutting down the message handler;

generating a restored order scheduling system by replacing a current version of the order scheduling system with a previously saved version;

restarting the restored order scheduling system;

restarting the message handler;

identifying scheduling assignments in the message handler that were generated by the order scheduling system subsequent to a time of the previously saved version;

identifying the subsequently generated scheduling assignments that remain open in the message handler; and transmitting the subsequently generated scheduling assignments that remain open in the message handler to the restored order scheduling system.

11. The method of claim 10, the act of identifying scheduling assignments in the message handler that were generated by the order scheduling system subsequent to a time of the previously saved version comprising:

determining a highest number for a scheduling assignment in the restored order scheduling system; and determining higher numbered scheduling assignments in the message handler.

12. The method of claim 10, the act of identifying the subsequently generated scheduling assignments that remain open in the message handler comprising identifying the higher numbered scheduling assignments that remain open in the message handler.

13. A method for processing orphan information in a system having a message handler communicating orders from a plurality of disparate hosts to an order processing system for assignment to remote resources, comprising:

receiving at the order processing system and from the remote resources a response to an assignment;

determining whether the response is properly associated with an order in the order processing system;

if the response is properly associated with an order in the order processing system, including with the response a normal transaction ID of the order;

if the response is not properly associated with an order in the order processing system, including with the response a predefined orphan transaction ID;

transmitting the response to the message handler;

at the message handler, associating the response with a corresponding order previously sent to the order processing system;

in response to at least the orphan transaction ID, generating a message operable to delete the corresponding order from the order processing system; and transmitting the message to the order processing system.

14. The method of claim 13, wherein the remote resources include a mobile workforce.

15. The method of claim 13, wherein the order processing system is a computer-aided dispatch system.

16. The method of claim 13, further comprising in response to the orphan transaction ID and a specified type of response, generating the message and transmitting the message to the order processing system.

17. The method of claim 16, wherein the specified type of response is an order completed response.

18. A resource management system, comprising:

a plurality of disparate hosts;

an order processing system;

a message handler disposed between the disparate hosts and the order processing system to communicate orders from the hosts to the order processing system for assignment to remote resources; and a recovery system for the resource management system operable to restore the order processing system by replacing a current version of the order processing system with a previously saved version, set each order in the restored order processing system to pending, identify orders in the restored order processing system that were closed subsequent to a time of the previously saved version, delete the closed orders from the restored order processing system, identify orders in the message handler that were transmitted from the message handler to the order processing system subsequent to the time of the previously saved version, identify the subsequently transmitted orders that remain open in the message handler, and transmit the subsequently transmitted orders that remain open in the message handler to the restored order processing system for assignment to the remote resources.

19. The resource management system of claim 18, wherein the recovery system is operable to transmit the subsequently transmitted orders that remain open in the message handler to the restored order processing system in their original order.

20. The resource management system of claim 18, further comprising:

a table in the message handler operable to store a status of each order transmitted from the message handler to the order processing system; and the recovery system operable to use the status of the subsequently transmitted orders to identify those that remain open.

21. A resource management system, comprising:

a plurality of disparate hosts;

an order scheduling system;

a message handler disposed between the disparate hosts and the order scheduling system to communicate scheduling messages from the hosts to the order scheduling system for assignment; and a recovery system for the resource management system operable to generate a restored order scheduling system by replacing a current version of the order scheduling system with a previously saved version, identify scheduling assignments in the message handler that were generated by the order scheduling system subsequent to a time of the previously saved version, identify the subsequently generated scheduling assignments that remain open in the message handler, and transmit the subsequently generated scheduling assignments that remain open in the message handler to the restored order scheduling system.

22. The resource management system of claim 21, wherein the recovery system is further operable to identify scheduling assignments in the message handler that were generated by the order scheduling system subsequent to a time of the previously saved version by determining a highest number for a scheduling assignment in the restored order scheduling system and determining higher numbered scheduling assignments in the message handler.

* * * * *